(12) United States Patent
Kumano et al.

(10) Patent No.: US 6,884,556 B2
(45) Date of Patent: Apr. 26, 2005

(54) ELECTROPHOTOGRAPHIC PHOTORECEPTOR

(75) Inventors: Yuuta Kumano, Kanagawa (JP); Satoshi Kato, Kanagawa (JP); Chiyoko Sato, Kanagawa (JP); Akiteru Fujii, Kanagawa (JP); Mamoru Nozomi, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/224,352

(22) Filed: Aug. 21, 2002

(65) Prior Publication Data

US 2003/0087173 A1 May 8, 2003

(30) Foreign Application Priority Data

| Aug. 21, 2001 | (JP) | 2001-250234 |
| Aug. 21, 2001 | (JP) | 2001-250662 |
| Aug. 24, 2001 | (JP) | 2001-255214 |
| Aug. 30, 2001 | (JP) | 2001-262361 |

(51) Int. Cl.$^7$ ................................. G03G 5/00
(52) U.S. Cl. ........................... 430/96; 430/59.6
(58) Field of Search .................... 430/96, 59.6

(56) References Cited

U.S. PATENT DOCUMENTS

| 4,006,120 A | 2/1977 | Behr et al. |
| 5,356,743 A | 10/1994 | Yanus et al. |
| 5,804,344 A | 9/1998 | Mitsumori |
| 5,932,384 A | 8/1999 | Mitsumori et al. |
| 6,185,398 B1 * | 2/2001 | Tanaka et al. ............... 399/174 |
| 6,482,560 B1 | 11/2002 | Mitsumori et al. |
| 2002/0025483 A1 * | 2/2002 | Kawamura et al. ........ 430/59.6 |

FOREIGN PATENT DOCUMENTS

| EP | 0 073 575 | 3/1983 |
| EP | 0 736 561 | 10/1996 |
| JP | 56-135844 | 10/1981 |
| JP | 57-73021 | 5/1982 |
| JP | 3-6567 | 1/1991 |
| JP | 10-288845 | 10/1998 |
| JP | 10-288846 | 10/1998 |

OTHER PUBLICATIONS

Dewrent Publications, AN 1999–019403, XP–002224283, JP 10–288846, Oct. 27, 1998.
U.S. Appl. No. 10/246,628, filed Sep. 19, 2002, Mitsumori et al.
U.S. Appl. No. 09/739,336, filed Dec. 19, 2000.

* cited by examiner

Primary Examiner—Christopher Rodee
(74) Attorney, Agent, or Firm—Oblon, Spivak, McClelland, Maier & Neustadt, P.C.

(57) ABSTRACT

Electrophotographic photoreceptors having improved mechanical properties, electrical properties with excellent response characteristics are prepared by forming a photosensitive layer on an electroconductive substrate. The photosensitive layer contains a binder resin, which may be a polyarylate or a copolymer of polyarylate. The binder resin may be mixed with other resins up to 50 wt % with other resins to impove surface slip properties or fire retardant properties.

28 Claims, No Drawings

ELECTROPHOTOGRAPHIC PHOTORECEPTOR

CROSS REFERENCE TO RELATED APPLICATIONS

This application claims priority to Japanese Patent Application 2001-250234, filed on Aug. 21, 2001; Japanese Patent Application 2001-250662, filed on Aug. 21, 2001; Japanese Patent Application 2001-255214, filed on Aug. 24, 2001; and Japanese Patent Application 2001-262361, filed on Aug. 30, 2001, all of which are incorporated herein by reference in their entireties.

BACKGROUND OF THE INVENTION

1. Field of the Invention

The present invention relates to electrophotographic photoreceptors having a photosensitive layer formed on an electroconductive substrate. More particularly, the present invention relates to electrophotographic photoreceptors which contain a resin for an electrophotographic photoreceptor in which the resins is excellent in solubility in preparation of a coating liquid to form a photosensitive layer and storage stability of the coating solution, and has good electric response characteristics.

2. Discussion of the Background

Electrophotographic technology, in recent years, has found widespread application not only in the field of copying machines, but also in the field of various printers, because it can quickly provide images of high quality.

As for the photoreceptor which is the core of the electrophotographic technology, there have been developed photoreceptors using, as the photoconductive materials, conventional inorganic photoconductors such as selenium, arsenic-selenium alloy, cadmium sulfide, and zinc oxide, and in recent years, organic photoconductive materials which have the advantages of entailing no pollution, ensuring easy film-forming, being easy to manufacture, and the like.

As the organic photoreceptors, there are known the so-called dispersion type photoreceptors obtained by dispersing a photoconductive fine powder in a binder resin, and the lamination type photoreceptors obtained by laminating a charge generation layer and a charge transport layer. Further, as the lamination type photoreceptor, an ordered lamination type photoreceptor wherein the charge generation layer and the charge transport layer are laminated in this order on an electroconductive substrate, and a reversed lamination type photoreceptor wherein the charge transport layer and the charge generation layer are laminated in this order, are known.

The lamination type photoreceptor has a high possibility of ranking as a dominant photoreceptor because: (1) a high sensitivity photoreceptor can be provided by using a charge generation material and a charge transport material each having a high efficiency in combination; (2) a high safety photoreceptor can be obtained because of its wide material selection range; (3) and it is relatively advantageous in terms of cost due to its high productivity of coating. Therefore, it has been vigorously developed and has gone into actual use.

The electrophotographic photoreceptor is repeatedly used in an electrophotographic process, i.e., in cycles of charging, exposure, development, transfer, cleaning, charge removal, and the like, during which it is subjected to various stresses to be deteriorated. Such deterioration includes chemical or electrical deterioration due to the following facts. That is, strongly oxidizing ozone or $NO_x$ arising from, for example, a corona charger commonly used as a charger can cause chemical damage to a photosensitive layer. In addition, carriers (current) generated upon image exposure passes through the inside of the photosensitive layer and can damage the photosensitive layer. The photosensitive composition may also be decomposed by charge-removed light or light from the outside. Further, there may occur mechanical deteriorations of abrasion or occurrence of flaws on the surface of the photosensitive layer, or peeling off of a film due to rubbing with a cleaning blade, a magnetic brush, or the like, contact with a developing agent or paper, and the like.

Especially, such damage on the photosensitive layer surface tends to become evident on the copied image. Accordingly, it directly damages the image quality and hence it is largely responsible for restricting the life of the photoreceptor. Accordingly, enhancement of the electrical and chemical durability of the photosensitive layer, as well as the enhancement of the mechanical strength of the photosensitive layer, are essential conditions for developing a long-life photoreceptor.

In general, it is a charge transport layer which is the outermost layer that receives such a load in the case of the ordered lamination type photoreceptor. The charge transport layer generally comprises a binder resin and a charge transport material. It is the binder resin that substantially determines the strength. However, since the amount of the charge transport material to be doped is considerably large, a sufficient mechanical strength has not yet been achieved.

Further, there has been a demand for a material adaptable to a higher-speed electrophotographic process to meet a growing need for a higher-speed printing. In this case, the photoreceptor is required not only to have a high sensitivity and a long life, but also to have good response characteristics so as to reduce the length of time between exposure and development thereof. It is known that, although the response characteristics are controlled by the charge transport layer, especially the charge transport material, it is also largely affected by the binder resin.

Each of the layers constituting the electrophotographic photoreceptor is formed by coating on a substrate by dip coating, spray coating, nozzle coating, bar coating, roll coating, blade coating, or the like.

Particularly, as the method of forming the charge transport layer, a known method of coating a coating solution obtained by dissolving materials to be contained in the layer in a solvent, for example, has been applied. In such an existing process, a coating solution is preliminarily prepared and preserved. Accordingly, the binder resin is required to be excellent also in regard to solubility in a solvent used for coating process, and stability of the coating solution after dissolution.

As conventional binder resins of the charge transport layer, there have been used thermoplastic resins and various thermosetting resins, including vinyl polymers such as polymethyl methacrylate, polystyrene, and polyvinyl chloride, and copolymers thereof, polycarbonate, polyester, polysulfone, phenoxy, epoxy, and silicone resins. The polycarbonate resin has a relatively excellent performance out of a large number of the binder resins, and hence various polycarbonate resins have been developed and have gone into actual use so far. However, in actuality, since the conventional organic photoreceptors employing conventional polycarbonate exhibit the drawbacks that the surface is worn and that flaws on the surface occur due to loads applied in use, such as development with toner, friction with paper, and abrasion by the cleaning member (blade), they have only the restricted printing performances in actual use.

On the other hand, in JP-A-56-135844, there is disclosed the technology of an electrophotographic photoreceptor using a polyarylate resin and a binder, commercially available under the tradename "U-polymer". In the publication, it is shown that the electrophotographic photoreceptor thus disclosed is particularly excellent in sensitivity as compared with the one using polycarbonate.

In JP-A-3-6567, there is disclosed an electrophotographic photoreceptor containing a polyarylate copolymer having a structure using tetramethylbisphenol F and bisphenol A as bisphenol components.

Further, in JP-A-10-288845, it is disclosed that use of a polyarylate resin using a bisphenol component of a specific structure as the binder resin improves the solution stability in manufacturing the photoreceptor. In JP-A-10-288846, it is disclosed that an electrophotographic photoreceptor using a polyarylate resin having a specific kinematic viscosity range is excellent in the mechanical strength, especially the abrasion resistance.

However, when currently available polyarylate resins are used for the electrophotographic process, although abrasion resistance and sensitivity may be slightly improved, the stability of the coating liquid is poor, the coating production is difficult, and no adequate performance can be obtained in view of electric characteristics particularly sensitivity and response characteristics.

Further, although the solubility/solution stability, the mechanical strength, and the like are improved by using the polyarylate resin of a specific structure as disclosed in JP-A-10-288845 and JP-A-10-288846, the electric characteristics, especially the response characteristics have been unsatisfactory because of a recent growing demand for a higher-speed printing.

Therefore, in actuality, there has been a demand for a binder resin which ensures an excellent mechanical strength, is easy to dissolve in a coating solution solvent and is excellent in the storage stability of the coating solution, and is excellent in electric characteristics particularly response characteristics.

Further, in JP-A-57-73021 (U.S. Pat. No. 4,426,511, European Patent No. 0,050,821), a polyarylate of a specific structure excellent in heat resistance is disclosed. However, in the publication, application of such a polyarylate of the specific structure to electrophotographic photoreceptors, and required mechanical characteristics, electric characteristics, and the like, are not disclosed.

Thus, there remains a need for improved electrophotographic photoreceptors, which exhibit improved mechanical properties and electrical properties. There also remains a need for improved methods of producing such electrophotographic photoreceptors and improved materials for producing such electrophotographic photoreceptors.

SUMMARY OF THE INVENTION

Accordingly, it is one object of the present invention to provide novel electrophotographic photoreceptors.

It is another object of the present invention to provide novel electrophotographic photoreceptors, which exhibit improved mechanical properties.

It is another object of the present invention to provide novel electrophotographic photoreceptors, which exhibit improved electrical properties, such as response time.

It is another object of the present invention to provide novel methods for producing such electrophotographic photoreceptors.

It is another object of the present invention to provide novel materials useful for producing such electrophotographic photoreceptors.

These and other objects, which will become apparent during the following detailed description have been achieved by the inventors' discovery that by using a resin obtained by polymerization using at least two types of monomers of a specific structure as the binder resin, a high solubility in a coating liquid solvent and excellent storage stability of the coating liquid are ensured, good coated surface is formed, and excellent electric characteristics, especially excellent response characteristics are ensured. Thus, they have completed the present invention.

More specifically, the present invention provides an electrophotographic photoreceptor having at least a photosensitive layer formed on an electroconductive substrate, wherein the photosensitive layer contains a resin having repeating units of the following formula (1):

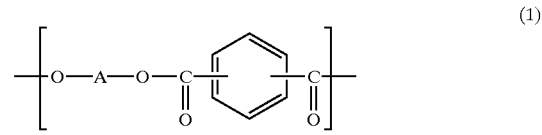

where, in the formula (1), A represents a plurality of bivalent groups including at least two members selected from the group consisting of bivalent groups of the following formulae (2), (3) and (4):

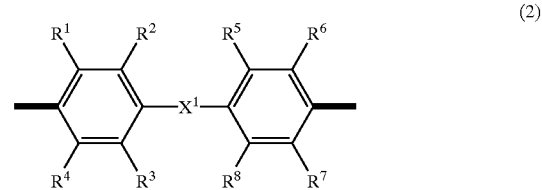

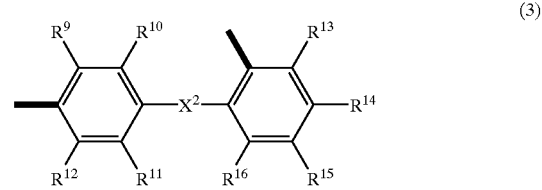

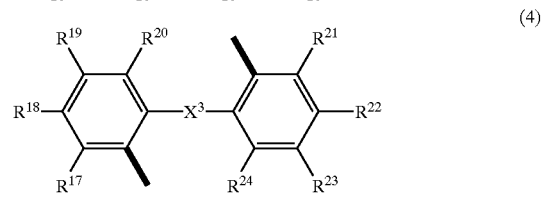

where, in the formulae (2), (3) and (4), each of $R^1$ to $R^{24}$ which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group or a substituted or unsubstituted $C_{6-20}$ aromatic group, and each of $X^1$, $X^2$ and $X^3$ which may be the same or different, represents a single bond, a bivalent organic group of the formula (5), —O—, —S—, —CO—, —SO$_2$— or —(CH$_2$)$_S$— (wherein S is an integer of from 2 to 5):

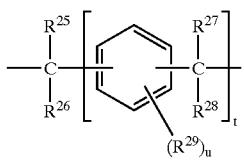

where, in the formula (5), each of $R^{25}$ to $R^{29}$ which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group or a substituted or unsubstituted $C_{6-20}$ aromatic group, provided that $R^{25}$ and $R^{26}$, and $R^{27}$ and $R^{28}$, may be bonded to each other to form a cycle, t is an integer of from 0 to 5, $R^{29}$ represents a $C_{1-10}$ alkyl group, a $C_{1-10}$ alkoxyl group, a halogen atom, a halogenated alkyl group or a substituted or unsubstituted $C_{6-20}$ aromatic group, and u is an integer of from 0 to 4.

That is, one key feature of the present invention is that a resin which containing a group of the formula (3) and/or a group of the formula (4) as the component A in the formula (1) is employed.

DETAILED DESCRIPTION OF THE PREFERRED EMBODIMENTS

Now, the present invention will be described in detail with reference to the preferred embodiments.

Resin for Electrophotographic Photoreceptor

The electrophotographic photoreceptor of the present invention is characterized in that the photosensitive layer contains a resin (referred to sometimes as a polyarylate resin) having repeating units of the formula (1).

The resin comprising the structure of the formula (1) of the present invention has a viscosity-average molecular weight of from 8,000 to 300,000, preferably from 15,000 to 100,000, more preferably from 20,000 to 50,000. If the viscosity-average molecular weight is less than 10,000, mechanical strength of the resin tends to decrease, such being unpractical, and if it is at least 300,000, when the photosensitive layer is formed on an electroconductive substrate, it tends to be difficult to coat the photosensitive layer in an appropriate thickness.

Each of the units of formulae (2), (3), and (4) may be present in an amount of 1 to 99 mol % based on the total number of monomeric units of formula (1) in the resin. The preferred amount for the units of formula (2) is at most 45 mol % based on the number of monomeric units of formula (1). The preferred amount for the units of formula (3) is at most 30 mol % based on the number of monomeric units of formula (1). The preferred amount for the units of formula (4) is at most 15 mol % based on the monomeric units of formula (1). It is preferred that the amounts of the units of formulae (2), (3), and (4) are not increased much over these specified amounts.

Further, the polyarylate resin of the present invention may be mixed with another resin to be used for the electrophotographic photoreceptor. Said another resin to be mixed may, for example, be a vinyl polymer such as polymethyl methacrylate, polystyrene or polyvinyl chloride, a copolymer thereof, a thermoplastic resin such as polycarbonate, polyester, polysulfone, phenoxy, epoxy or a silicone resin or a thermosetting resin. Among such resins, a polycarbonate resin may be mentioned as a preferred resin.

When the polyarylate resin of the present invention is used for the electrophotographic photoreceptor as mixed with another resin, the amount of another resin is usually at most 50 wt %, preferably at most 30 wt %, most preferably at most 10 wt %, based on the entire binder resin. Thus, the amount of the other resin may be 1 to 50 wt %, more typically 1 to 30 wt %, even more typically 1 to 10 wt %, based on the entire binder resin. Further, when a polyester resin of the present invention is used as a surface slip property improving agent or a fire retardancy imparting agent, at most 50 wt %, preferably at most 20 wt %, most preferably at most 5 wt %, based on the entire resin, of a polyester or another resin containing no polysiloxane structure may be used.

Further, the polyarylate resin of the present invention may be a copolymer with another resin. The copolymer may be any of block, graft and multi-block copolymers. Said another resin to be copolymerized may, for example, be polycarbonate, polysulfone, polyether, polyketone, polyamide, polysiloxane, polyimide, polystyrene, or polyolefin. Among them, most preferred is polycarbonate in view of electric characteristics and mechanical characteristics. The amount of the copolymerizable component other than the polyarylate is usually at most 70 mol %, preferably at most 50 mol %, most preferably at most 30 mol %, based on the number of moles of monomeric units in the entire copolymer in view of mechanical characteristics. Thus, the copolymerizable component other than the polyarylate may be present in an amount of 1 to 70 mol %, more typically 1 to 50 mol %, even more typically 1 to 30 mol %, based on the number of moles of monomeric units in the entire copolymer.

Specific examples of the polyarylate resin of the formula (1) will further be shown, however, the present invention is by no means restricted to such specific examples.

As the constituting unit in the formula (1) represents a plurality of bivalent groups, including at least two members selected from the group consisting of bivalent groups of the following formulae (2), (3) and (4). Such structures are residues derived from a p,p'-form, an o,p'-form and an o,o'-form, respectively, of a biphenol component or a bisphenol component, used in production of the polyarylate resin used in the present invention. They may be selected from positional isomers of the same rational formula or from positional isomers of different rational formulae.

Further, the polyarylate resin is preferably a copolymer with repeating units of the formula (6):

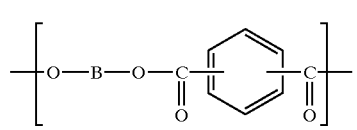

where, in the formula (6), B represents a bifunctional phenol component, a biphenol component, a bisphenol component or a bivalent group of the following formula (7):

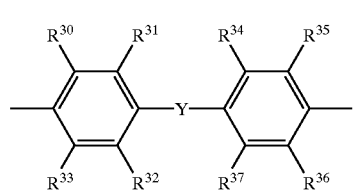

wherein each of $R^{30}$ to $R^{37}$ which are independent of one another, represents a hydrogen atom, a $C_{1-10}$ alkyl group, a $C_{1-10}$ alkoxyl group, a halogen atom, a halogenated alkyl group or a substituted or unsubstituted $C_{6-20}$ aromatic group, Y represents a single bond or —$CR^{38}R^{39}$—, and each of $R^{38}$ and $R^{39}$ represents a hydrogen atom, a $C_{1-10}$ alkyl group, a $C_{1-10}$ alkoxyl group, a halogen atom, a halogenated alkyl group or a substituted or unsubstituted $C_{6-20}$ aromatic group, provided that $R^{38}$ and $R^{39}$ may be bonded to each other to form a cycle, provided that the group of the formula (7) is not the same as the group of the formula (2).

Each of $R^1$ to $R^{24}$ in the formulae (2), (3) and (4) which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group or a substituted or unsubstituted $C_{6-20}$ aromatic group. The alkyl group may, for example, be a methyl group, an ethyl group, a n-propyl group, an i-propyl group, a n-butyl group, an i-butyl group, a sec-butyl group, a tert-butyl group, a n-pentyl group, a sec-pentyl group or a n-hexyl group, and the alkoxyl group may, for example, be a methoxy group, an ethoxy group, a n-propoxy group or a n-butoxy group. The halogen atom may, for example, be a chlorine atom, a bromine atom or a fluorine atom, and the halogenated alkyl group may, for example, be a chloromethyl group, a dichloromethyl group, a trichloromethyl group or a trifluoromethyl group. The substituted or unsubstituted aromatic group may, for example, be a phenyl group, a 4-methylphenyl group or a naphthyl group. Among them, preferred is an alkyl group, particularly preferred is a methyl group.

Each of $X^1$ to $X^3$ which may be the same or different, represents a single bond, a bivalent organic group of the formula (5), —O—, —S—, —CO—, —$SO_2$— or —$(CH_2)_S$— (wherein S is an integer of from 2 to 5). Among them, preferred is —$(CH_2)_S$—, a bivalent organic group of the formula (5) or a single bond, particularly preferred is —$CH_2$—.

When $X^1$ to $X^3$ are —$CH_2$—, the proportion of the bivalent group of the formula (2) is preferably at most 45 mol % based on the total number of moles of bivalent groups represented by A and B in said resin, in view of solubility in an organic solvent containing no halogen atom, such as tetrahydrofuran or toluene.

In the formula (5), each of $R^{25}$ to $R^{29}$ which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group or a substituted or unsubstituted $C_{6-20}$ aromatic group. Specific examples thereof are as defined above. Further, $R^{25}$ and $R^{26}$, and $R^{27}$ and $R^{28}$, may be bonded to each other to form a cycle.

Among them, preferred is a hydrogen atom, a $C_{1-10}$ alkyl group or a $C_{1-10}$ alkoxyl group, and $R^{25}$ and $R^{26}$, and $R^{27}$ and $R^{28}$, may be bonded to each other to form a cycle. Further, particularly preferred is a hydrogen atom.

t is an integer of at least 0, preferably 0 or 1, particularly preferably t=0. u is an integer of from 0 to 4.

As noted above, the units of formulae (2), (3), and (4) correspond to those structures derived from a biphenol or bisphenol component. For example, p,p'-biphenylene (a unit according to formula (2)) corresponds to the unit derived by removing the two hydroxyl groups from 4,4'-biphenol.

Other specific examples of the biphenylene unit of the formula (2) include those which correspond to the structures likewise derived from the following biphenol components such as 4,4'-biphenol, 3,3'-dimethyl-4,4'-dihydroxy-1,1'-biphenyl[3,3'-dimethyl-{(1,1'-bi-phenyl)-4,4'-diol}], 3,3'-di-(t-butyl)-4,4'-dihydroxy-1,1'-biphenyl[3,3'-di-(t-butyl)-{(1,1'-bi-phenyl)-4,4'-diol}], 3,3',5,5'-tetramethyl-4,4'-dihydroxy-1,1'-biphenyl[3,3',5,5'-tetramethyl-{(1,1'-bi-phenyl)-4,4'-diol}], 3,3',5,5'-tetra-(t-butyl)-4,4'-dihydroxy-1,1'-biphenyl[3,3',5,5'-tetra-(t-butyl)-{(1,1'-bi-phenyl)-4,4'-diol}] and 2,2',3,3',5,5'-hexamethyl-4,4'-dihydroxy-1,1'-biphenyl[2,2',3,3',5,5'-hexamethyl-{(1,1'-bi-phenyl)-4,4'-diol}], and bisphenol components such as bis(4-hydroxyphenyl)methane (BPF), bis-(4-hydroxy-3-methylphenyl)methane, 1,1-bis-(4-hydroxyphenyl)ethane (BPE), 1,1-bis-(4-hydroxyphenyl)propane, 2,2-bis-(4-hydroxyphenyl)propane (BPA), 2,2-bis-(4-hydroxy-3-methylphenyl)propane, 2,2-bis-(4-hydroxyphenyl)butane, 2,2-bis-(4-hydroxyphenyl)pentane, 2,2-bis-(4-hydroxyphenyl)-3-methylbutane, 2,2-bis-(4-hydroxyphenyl)hexane, 2,2-bis-(4-hydroxyphenyl)-4-methylpentane, 1,1-bis-(4-hydroxyphenyl)cyclopentane, 1,1-bis-(4-hydroxyphenyl)cyclohexane (BPZ), bis-(3-phenyl-4-hydroxyphenyl)methane, 1,1-bis-(3-phenyl-4-hydroxyphenyl)ethane, 1,1-bis-(3-phenyl-4-hydroxyphenyl)propane, 2,2-bis-(3-phenyl-4-hydroxyphenyl)propane (BPQ), 1,1-bis-(4-hydroxy-3-methylphenyl)ethane (Ce), 2,2-bis-(4-hydroxy-3-methylphenyl)propane (BPC), 2,2-bis-(4-hydroxy-3-ethylphenyl)propane, 2,2-bis-(4-hydroxy-3-isopropylphenyl)propane, 2,2-bis-(4-hydroxy-3-sec-butylphenyl)propane, 1,1-bis-(4-hydroxy-3,5-dimethylphenyl)ethane (Xe), 2,2-bis-(4-hydroxy-3,5-dimethylphenyl)propane (Tma), 1,1-bis-(4-hydroxy-3,6-dimethylphenyl)ethane, bis-(4-hydroxy-2,3,5-trimethylphenyl)methane, 1,1-bis-(4-hydroxy-2,3,5-trimethylphenyl)ethane, 2,2-bis-(4-hydroxy-2,3,5-trimethylphenyl)propane, bis-(4-hydroxy-2,3,5-trimethylphenyl)phenylmethane, 1,1-bis-(4-hydroxy-2,3,5-trimethylphenyl)phenylethane, 1,1-bis-(4-hydroxy-2,3,5-trimethylphenyl)cyclohexane, bis-(4-hydroxyphenyl)phenylmethane, 1,1-bis-(4-hydroxyphenyl)-1-phenylethane (BPP), 1,1-bis-(4-hydroxyphenyl)-1-phenylpropane, bis-(4-hydroxyphenyl)diphenylmethane, bis-(4-hydroxyphenyl)dibenzylmethane, 4,4'-[1,4-phenylenebis(1-methylethylidene)]bis-[phenol], 4,4'-[1,4-phenylenebismethylene]bis-[phenol], 4,4'-[1,4-phenylenebis(1-methylethylidene)]bis-[2,6-dimethylphenol], 4,4'-[1,4-phenylenebismethylene]bis-[2,6-dimethylphenol], 4,4'-[1,4-phenylenebismethylene]bis-[2,3,6-trimethylphenol], 4,4'-[1,4-phenylenebis(1-methylethylidene)]bis-[2,3,6-trimethylphenol], 4,4'-[1,3-phenylenebis(1-methylethylidene)]bis-[2,3,6-trimethylphenol], 4,4'-dihydroxy diphenyl ether (BPO), 4,4'-dihydroxydiphenylsulfone, 4,4'-dihydroxydiphenylsulfide, 3,3',5,5'-tetramethyl-4,4'-dihydroxy diphenyl ether, 3,3',5,5'-tetramethyl-4,4'-dihydroxydiphenylsulfone, 3,3',5,5'-tetramethyl-4,4'-dihydroxydiphenylsulfide, phenolphthalein, 4,4'-[1,4-phenylenebis(1-methylvinylidene)]bisphenol, and 4,4'-[1,4-phenylenebis(1-methylvinylidene)]bis[2-methylphenol], bis(2-benzyl-4-hydroxyphenyl)methane, bis(2-benzyloxy-4-hydroxyphenyl)methane, bis(2-methoxy-4-hydroxyphenyl)methane, bis(3-(p-tolyl)-4-hydroxyphenyl)methane, 4,4'-(1,4-phenylenebis(1-methylethylidene))bis-(phenol), 4,4'dihydroxyphenylether, 4,4-dihydroxyphenylsulfone, 4,4'dihydroxyphenylsulfide, 4,4'dihydroxybenzophenone, and 1,2-bis-(4-hydroxyphenyl)ethane.

Preferably, the unit of formula (2) has the structure likewise derived from the bisphenol components such as bis-(4-hydroxyphenyl)methane (BPF), bis-(4-hydroxy-3-methylphenyl)methane, 1,1-bis-(4-hydroxyphenyl)ethane (BPE) and 2,2-bis-(4-hydroxyphenyl)propane (BPA) may be mentioned. Among them, the unit derived from bis-(4-hydroxyphenyl)methane is particularly preferred.

Specific examples of the biphenol component and the bisphenol component having the structure of the formula (3) include biphenol components such as 2,4'-biphenol, 3,3'-dimethyl-2,4'-dihydroxy-1,1'-biphenyl[3,3'-dimethyl-{(1,1'-bi-phenyl)-2,4'-diol}] and 3,3'-di-(t-butyl)-2,4'-dihydroxy-1, 1'-biphenyl[3,3'-di-(t-butyl)-{(1,1'-bi-phenyl)-2,4'-diol}], and bisphenol components such as (2-hydroxyphenyl)(4-hydroxyphenyl)methane, (2-hydroxy-5-methylphenyl)(4-hydroxy-3-methylphenyl)methane, 1,1-(2-hydroxyphenyl)(4-hydroxyphenyl)ethane, 2,2-(2-hydroxyphenyl)(4-hydroxyphenyl)propane, 1,1-(2-hydroxyphenyl)(4-hydroxyphenyl)propane, (2-hydroxy-4-benzylphenyl)(2-benzyl-4-hydroxyphenyl)methane, 2-hydroxy-4-benzyloxyphenyl)(2-benzyloxy-4-hydroxyphenyl)methane, 2-hydroxy-4-methoxyphenyl)(2-methoxy-4-hydroxyphenyl)methane, (3-p-tolyl)-4-hydroxyphenyl)(2-hydroxy-3-(p-tolyl)phenyl)methane, (2-hydroxyphenyl)(4-hydroxyphenyl)(1,4-phenylenebis(1-methylethylidene)), 2,4'-dihydroxyphenylether, 2,4'-dihydroxyphenylsulfone, 2,4'-dihydroxyphenylsulfide, 2,4'-dihydroxybenzophenone, and 1-(4-hydroxyphenyl)-2-(2-hydroxyphenyl)ethane.

Among them, preferred are (2-hydroxyphenyl)(4-hydroxyphenyl)methane, 2,2-(2-hydroxyphenyl)(4-hydroxyphenyl)propane, (2-hydroxy-3-methoxyphenyl)(3-methoxy-4-hydroxyphenyl)methane, and particularly preferred is (2-hydroxyphenyl)(4-hydroxyphenyl)methane.

Specific examples of the biphenol component and the bisphenol component having the structure of the formula (4) include biphenol components such as 2,2'-biphenol, 3,3'-dimethyl-2,2'-dihydroxy-1,1'-biphenyl[3,3'-dimethyl-{(1,1'-bi-phenyl)-2,2'-diol}] and 3,3'-di-(t-butyl)-2,2'-dihydroxy-1, 1'-biphenyl[3,3'-di-(t-butyl)-{(1,1'-bi-phenyl)-2,2'-diol}], and bisphenol components such as bis-(2-hydroxyphenyl)methane, 1,1-bis-(2-hydroxyphenyl)ethane, 2,2-bis(2-hydroxyphenyl)propane, 1,1-bis-(2-hydroxyphenyl)propane, bis-(2-hydroxy-5-methylphenyl)methane, bis-(2-hydroxy-3-methylphenyl)methane, 1,1-bis-(2-hydroxy-4-phenyl)ethane, bis-(2-hydroxy-3,5-dimethylphenol)methane, bis-(2-hydroxy-3,6-dimethylphenol)methane, 2,2-bis-(2-hydroxy-3,5-dimethylphenol)propane, bis(2-hydroxy-4-benzylphenyl)methane, bis(2-hydroxy-4-benzyloxyphenyl)methane, bis(2-hydroxy-4-methoxyphenyl)methane, bis(2-hydroxy-3-(p-tolyl)phenyl)methane, 2,2'-(1,4-phenylene bis(1-methylethylidene))bis-(phenol), 2,2'-dihydroxyphenylether, 2,2'-dihydroxyphenylsulfone, 2,2'-dihydroxyphenylsulfide, 2,2'-dihydroxybenzophenone, and 1,2-bis-(2-hydroxyphenyl)ethane.

Among them, preferred are bis-(2-hydroxyphenyl)methane and 2,2-bis-(2-hydroxyphenyl)propane, and particularly preferred is bis-(2-hydroxyphenyl)methane.

The polyarylate resin to be used for the electrophotographic photoreceptor of the present invention is preferably a copolymer with repeating units which are different from the repeating units of the formula (1), and the repeating units are preferably represented by the formula (6). B in the formula (6) may be a bifunctional phenol component, a biphenol component, a bisphenol component or one represented by the formula (7).

The content of the repeating units of the formula (1) in the polyarylate resin as a copolymer is usually from 10 to 90 mol %, preferably from 20 to 80 mol %, particularly preferably from 30 to 70 mol %, based on the total moles of monomeric units in the copolymer.

Specific examples of the bifunctional phenol component, biphenol component and bisphenol component includes bifunctional phenol components such as hydroquinone, resorcinol, 1,3-dihydroxynaphthalene, 1,4-dihydroxynaphthalene, 2,3-dihydroxynaphthalene, 2,6-dihydroxynaphthalene, 2,7-dihydroxynaphthalene, 1,8-dihydroxynaphthalene and 1,5-dihydroxynaphthalene, and the biphenol components and bisphenol components as mentioned as specific examples of the formula (2), which are not the same as the bivalent group of the formula (7).

Among B in the formula (6), the bivalent group of the formula (7) is more preferred. Here, the bivalent group of the formula (7) is not the same as the bivalent group of the formula (2).

Each of $R^{30}$ to $R^{37}$ in the formula (7) which are independent of one another, represents a hydrogen atom, a $C_{1-10}$ alkyl group, a $C_{1-10}$ alkoxyl group, a halogen atom, a halogenated alkyl group or a $C_{6-20}$ aromatic group which may be substituted, preferably a hydrogen atom or a $C_{1-10}$ alkyl group, and particularly preferably, any four of them, are hydrogen atoms or any four of them are methyl groups.

In the formula (7), Y represents a single bond or —$CR^{38}R^{39}$—, and each of $R^{38}$ and $R^{39}$ represents a hydrogen atom, a $C_{1-10}$ alkyl group, a $C_{1-10}$ alkoxyl group, a halogen atom, a halogenated alkyl group or a substituted or unsubstituted $C_{6-20}$ aromatic group. Further, $R^{38}$ and $R^{39}$ may be bonded to each other to form a cycle. Among them, Y is preferably —$CR^{38}R^{39}$—, particularly preferably —$CH_2$—.

Among them, as preferred compounds, bisphenol components such as 1,1-bis-(4-hydroxyphenyl)ethane (BPE), 2,2-bis-(4-hydroxyphenyl)propane (BPA), 1,1-bis-(4-hydroxyphenyl)cyclohexane (BPZ), 2,2-bis-(3-phenyl-4-hydroxyphenyl)propane (BPQ), 1,1-bis-(4-hydroxy-3-methyphenyl)ethane (Ce), 2,2-bis-(4-hydroxy-3-methylphenyl)propane (BPC), 1,1-bis-(4-hydroxy-3,5-dimethylphenyl)ethane (Xe), 2,2-bis-(4-hydroxy-3,5-dimethylphenyl)propane (Tma), bis-(4-hydroxy-3,5-dimethylphenyl)methane and 1,1-bis-(4-hydroxyphenyl)-1-phenylethane (BPP) may be mentioned. Among them, bis-(4-hydroxy-3,5-dimethylphenyl)methane is particularly preferred.

The unit having a structure of the formula (8) (shown below) is a residue derived from an aromatic dicarboxylic acid component used for production of the polyarylate resin used in the present invention. As the aromatic dicarboxylic acid component, a structure of the formula (9) is used.

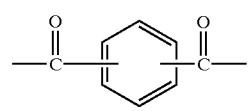
(8)

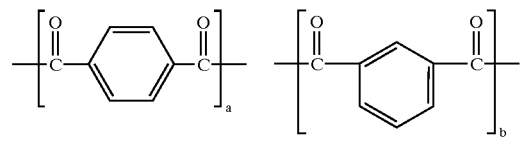
(9)

where, in the formula (9), a and b are values which satisfy $1 \geq a/(a+b) \geq 0$, preferably values which satisfy $1 \geq a/(a+b) \geq 0.01$, more preferably $1 \geq a/(a+b) \geq 0.5$, particularly preferably $1 \geq a/(a+b) \geq 0.7$, most preferably $a/(a+b)=1$. If the value of $a/(a+b)$ becomes small, electric characteristics of the photoreceptor may decrease or mechanical characteristics may decrease, such being unfavorable.

It is preferred that the polyarylate resin contain the groups of the formulae (3) and (4) in A in the formula (1) in an amount of from 30 to 100 mol %, based on the total moles of monomeric units of formula (1) in the polyarylate resin.

Production Method of Polyarylate Resin for Electrophotographic Photoreceptor

As a method for producing the resin for the electrophotographic photoreceptor of the present invention, a known polymerization method may be employed. It may, for example, be an interfacial polymerization method, a molten polymerization method or a solution polymerization method.

For example, in a case of production by an interfacial polymerization method, a solution having a bisphenol component dissolved in an aqueous alkaline solution and a solution of a halogenated hydrocarbon having an aromatic dicarboxylic chloride component dissolved therein, are mixed. At that time, as a catalyst, a quaternary ammonium salt or a quaternary phosphonium salt may be present. The polymerization temperature is preferably within a range of from 0 to 40° C., and the polymerization time is preferably within a range of from 2 to 12 hours, in view of productivity. After the completion of the polymerization, an aqueous phase and an organic phase are separated, and a polymer dissolved in the organic phase is washed and recovered by a known method to obtain an aimed resin.

The alkali component used may, for example, be a hydroxide of an alkali metal such as sodium hydroxide or potassium hydroxide. The amount of the alkali component is preferably within a range of from 1.01 to 3 equivalent amount of the phenolic hydroxyl groups contained in the reaction system.

The halogenated hydrocarbon used may, for example, be dichloromethane, chloroform, 1,2-dichloroethane, trichloroethane, tetrachloroethane or dichlorobenzene.

The quaternary ammonium salt or the quaternary phosphonium salt used as the catalyst may, for example, be a salt such as hydrochloride, bromate or iodate of a tertiary alkyl amine such as tributylamine or trioctylamine, or benzyltriethylammonium chloride, benzyltrimethylammonium chloride, benzyltributylammonium chloride, tetraethylammonium chloride, tetrabutylammonium chloride, tetrabutylammonium bromide, trioctylmethylammonium chloride, tetrabutyl phosphonium bromide, triethyloctadecyl phosphonium bromide, N-laurylpyridinium chloride or laurylpicolinium chloride.

Further, at the time of polymerization, as a molecular weight modifier, an alkyl phenol such as phenol, o,m,p-cresol, o,m,p-ethylphenol, o,m,p-propylphenol, o,m,p-tert-butylphenol, pentylphenol, hexylphenol, octylphenol, nonylphenol or a 2,6-dimethylphenol derivative, a monofunctional phenol such as o,m,p-phenylphenol, or a monofunctional acid halide such as acetic chloride, butyric chloride, octyric chloride, benzoyl chloride, benzene sulfinyl chloride, benzene sulfinyl chloride, sulfonyl chloride or benzene phosphonyl chloride, or a substituted product thereof, may be present. Among such molecular weight modifiers, preferred is a 2,6-dimethylphenol derivative in view of molecular weight modifying property.

Specific examples of the 2,6-dimethylphenol derivative include 2,6-dimethylphenol, 2,3,6-trimethylphenol, 2,4,6-trimethylphenol, 2,3,4,6-tetramethylphenol, 2,6-dimethyl-4-t-butylphenol, 2,6-dimethyl-4-nonylphenol, 2,6-dimethyl-4-acetylphenol and α-tocopherol. Among them, preferred is 2,3,6-trimethylphenol in view of solution stability of the formed polymer.

In the polyarylate resin comprising repeating units having a structure of the formula (1), groups present at the terminal of the molecular chain, such as groups derived from the above-described molecular weight modifier, are not included in the repeating units.

Electrophotographic Photoreceptor

The above-described resin of the present invention is used for an electrophotographic photoreceptor, and is used as a binder resin in a photosensitive layer provided on an electroconductive substrate of the photoreceptor.

As the electroconductive substrate, there are mainly used, for example, metallic materials such as aluminum, aluminum alloy, stainless steel, copper, and nickel, resin materials in which a conductive powder such as a metal, carbon, or tin oxide has been added for ensuring an electroconductivity, a resin, glass, or paper with a conductive material such as aluminum, nickel, or ITO (indium oxide-tin alloy) deposited or coated on its surface, or the like. They are used in drum form, sheet form, belt form, or the like. Alternatively, there may also be used the one obtained by coating a conductive material having an appropriate resistance value on an electroconductive substrate made of a metallic material for controlling the conductivity and the surface properties, or covering the defects.

When the metallic material such as an aluminum alloy is used as the electroconductive substrate, it may also be used after having undergone an anodic oxidation treatment, or a film formation treatment. When it is subjected to the anodic oxidation treatment, it is desirably subjected to a sealing treatment by a known method.

The substrate surface may be either smooth, or roughened by using a particular cutting method or carrying out a polishing treatment. Further, it may also be the one roughened by mixing particles with an appropriate particle size in the material constituting the substrate.

An undercoat layer may be provided between the electroconductive substrate and the photosensitive layer for improving the adhesion, the blocking tendency, and the like.

The undercoat layer usable may be a resin, the one obtained by dispersing particles of a metal oxide or the like in a resin, and the like.

Examples of the metal oxide particles for use in the undercoat layer include particles of a metal oxide including one metallic element such as titanium oxide, aluminum oxide, silicon oxide, zirconium oxide, zinc oxide, or iron oxide; and particles of a metal oxide including a plurality of metallic elements such as calcium titanate, strontium titanate, and barium titanate. These particles may be used singly, or in mixture of a plurality thereof. Out of these metallic oxide particles, the titanium oxide and the aluminum oxide are preferred, and the titanium oxide is particularly preferred. The titanium oxide particles may be surface-treated by an inorganic substance such as tin oxide, aluminum oxide, antimony oxide, zirconium oxide or silicon oxide, or an organic substance such as stearic acid, polyol or silicone. Any crystalline form of the titanium oxide particles such as rutile-, anatase-, brookite-, or amorphous-form may be used. A plurality of crystalline forms may also be included therein.

Further, although the particle size of the metal oxide particles usable may be various ones, among them, it is preferably from 10 to 100 nm, and in particular, it is preferably from 10 to 25 nm as the average primary particle size in view of the characteristics and the solution stability.

The undercoat layer is desirably formed into the structure in which the metal oxide particles are dispersed in the binder resin. Examples of the binder resin for use in the undercoat layer include phenoxy, epoxy, polyvinylpyrrolidone, polyvinyl alcohol, casein, polyacrylic acid, celluloses, gelatin, starch, polyurethane, polyimide, and polyamide, and they can be used respectively alone, or in a cured form with a curing agent. Among them, alcohol-soluble copolymerized polyamide, modified polyamide, or the like is preferred in that it exhibits good dispersibility and coating property.

The amount of the inorganic particles to be added to the binder resin can be optionally selected, but it is preferably in the range of from 10 to 500 wt % in view of the stability and the coating property of the dispersion.

The film thickness of the undercoat layer can be optionally selected, but it is preferably from 0.1 to 20 $\mu$m in view of the photoreceptor characteristics and the coating property. Further, a known antioxidant or the like may also be added to the undercoat layer.

As the concrete configuration of the photosensitive layer of the present invention, there can be mentioned the following type of photoreceptors as examples of basic forms:

a lamination-type photoreceptor so configured that, on an electroconductive substrate, a charge generation layer containing a charge generation material as the main component, and a charge transport layer containing a charge transport material and a binder resin as the main components are laminated in this order;

a reversed two layer type photoreceptor so configured that, on an electroconductive substrate, a charge transport layer containing a charge transport material and a binder resin as the main components and a charge generation layer containing a charge generation material as the main component are laminated in this order; and a dispersion type photoreceptor so configured that, on an electroconductive substrate, a layer containing a charge transport material and a binder resin is laminated, and a charge generation material is dispersed in the layer.

Examples of the charge generation material include selenium and alloys thereof, cadmium sulfide, and other inorganic photoconductive materials, and various photoconductive materials including organic pigments such as phthalocyanine pigments, azo pigments, quinacridone pigments, indigo pigments, perylene pigments, polycyclic quinone pigments, anthanthrone pigments, and benzimidazole pigments. The organic pigments are particularly preferred, and phthalocyanine pigments and azo pigments are more preferred. The fine particles of these charge generation materials are bound by various binder resins such as polyester resin, polyvinyl acetate, polyacrylic acid ester, polymethacrylic acid ester, polyester, polycarbonate, polyvinyl acetoacetal, polyvinyl propional, polyvinyl butyral, phenoxy resin, epoxy resin, urethane resin, cellulose ester, and cellulose ether to be used. The amount of the charge generation material to be used in this case is in the range of preferably from 30 to 500 parts by weight per 100 parts by weight of the binder resin, and the film thickness of the charge generation layer is generally from 0.1 to 1 $\mu$m, preferably from 0.15 to 0.6 $\mu$m.

When a phthalocyanine compound is used as the charge generation material, specifically, metal-free phthalocyanine and phthalocyanines in which metals such as copper, indium, gallium, tin, titanium, zinc, vanadium, silicon, and germanium, or oxides thereof, halides thereof, hydroxides thereof, alkoxides thereof, or the like are coordinated are used. In particular, high-sensitivity X-form, and τ-form metal-free phthalocyanines, A-form, B-form, D-form, or the like of titanyl phthalocyanine, vanadyl phthalocyanine, chloroindium phthalocyanine, chlorogallium phthalocyanine, hydroxygallium phthalocyanine, and the like are preferred. Incidentally, out of the crystal forms of titanyl phthalocyanine herein cited, the A-, and B-forms are referred to as I-, and II-phases, respectively by W. Hellers, et al., (Zeit. Kristallogr. 159 (1982) 173), and the A-form is known as the stable form. The D-form is the crystal form characterized in that a distinct peak is shown at a diffraction angle 2θ±0.2° of 27.3° in a powder X-ray diffraction using a CuK α ray. The phthalocyanine compounds may be used singly, or in mixture of some thereof. The phthalocyanine compounds herein used or the ones in crystal form in a mixed state may be obtained by mixing respective constituents afterwards, or by causing the mixed state in the manufacturing and treatment process of the phthalocyanine compound, such as synthesis, formation into pigment, crystallization, or the like. As such treatment, an acid paste treatment, a grinding treatment, a solvent treatment, or the like is known.

Examples of the charge transport material include electron-withdrawing substances including aromatic nitro compounds such as 2,4,7-trinitrofluorenone, cyano compounds such as tetracyanoquinodimethane, and quinones such as diphenoquinone, and electron donating substances including heterocyclic compounds such as carbazole derivatives, indole derivatives, imidazole derivatives, oxazole derivatives, pyrazole derivatives, oxadiazole derivatives, pyrazoline derivatives, and thiadiazole derivatives, aniline derivatives, hydrazone compounds, aromatic amine derivatives, stilbene derivatives, butadiene derivatives, and enamine compounds, and the ones obtained by combining a plurality of the compounds, and polymers having a group comprising these compounds at its main chain or side chain. Among them, carbazole derivatives, hydrazone derivatives, aromatic amine derivatives, stilbene derivatives, and butadiene derivatives, and the ones obtained by combining a plurality of the derivatives are preferred, and the ones obtained by combining a plurality of aromatic amine derivatives, stilbene derivatives, and butadiene derivatives, are particularly preferred.

Suitable charge transport materials are disclosed in U.S. Pat. Nos. 5,804,344 and 5,932,384, both of which are incorporated herein by reference in their entireties. Specifically, one having a structure of the following formula (10) is preferably used:

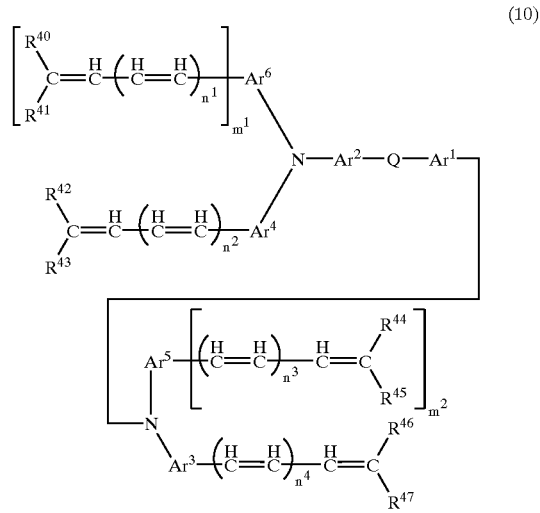

(10)

where, in the formula (10), each of $Ar^1$ to $Ar^4$ which are independent of one another, represents an arylene group which may have a substituent or a bivalent heterocycle group which may have a substituent, each of $Ar^5$ and $Ar^6$ represents, when $m^1=0$ and $m^2=0$, an alkyl group which may have a substituent, an aryl group which may have a substituent or a monovalent heterocycle group which may have a substituent, and when $m^1=1$ and $m^2=1$, an alkylene group which may have a substituent, an arylene group which may have a substituent or a bivalent heterocycle group which may have a substituent, Q represents a direct bond or a bivalent residue, each of $R^{40}$ to $R^{47}$ which are independent of one another, represents a hydrogen atom, an alkyl group which may have a substituent, an aryl group which may have a substituent, an aralkyl group which may have a substituent or a heterocycle group which may have a substituent, each of $n^1$ to $n^4$ which are independent of one another, represents an integer of from 0 to 4, and each of $m^1$ and $m^2$ which are independent of each other, represents 0 or 1, provided that $Ar^1$ to $Ar^6$ may be bonded to each other to form a cyclic structure.

In the formula (10), each of $R^{40}$ to $R^{47}$ which are independent of one another, represents an alkyl group which may have a substituent, an aryl group which may have a substituent, an aralkyl group which may have a substituent, a heterocycle group which may have a substituent or a hydrogen atom, and the alkyl group may, for example, be a methyl group, an ethyl group, a propyl group, an isopropyl group, a butyl group, a pentyl group, a hexyl group, a heptyl group, a cyclopentyl group or a cyclohexyl group, and among them, preferred is a $C_{1-6}$ alkyl group, particularly preferred is a methyl group.

The aryl group may, for example, be a phenyl group, a tolyl group, a xylyl group, a naphthyl group or a pyrenyl group, and preferred is a $C_{6-12}$ aryl group. Further, the aralkyl group may, for example, a benzyl group or a phenethyl group, and preferred is a $C_{7-12}$ aralkyl group.

As the heterocycle group, a heterocycle having aromaticity is preferred, and a furyl group, a thienyl group or a pyridyl group may, for example, be mentioned, and a monocyclic aromatic heterocycle is particularly preferred.

Further, in the formula (10), each of $Ar^1$ to $Ar^4$ which are independent of one another, represents an arylene group which may have a substituent or a bivalent heterocycle group which may have a substituent. Each of $m^1$ and $m^2$ which are independent of each other, is 0 or 1, and when $m^1$ and $m^2$ are 0, each of $Ar^5$ and $Ar^6$ which are independent of each other, represents an alkyl group which may have a substituent, an aryl group which may have a substituent or a monovalent heterocycle group which may have a substituent, and when $m^1$ and $m^2$ are 1, each of them represents an alkylene group which may have a substituent, an arylene group which may have a substituent or a bivalent heterocycle group which may have a substituent.

As the aryl group, a phenyl group, a tolyl group, a xylyl group, a naphthyl group or a pyrenyl group may, for example, be mentioned, and a $C_{6-14}$ aryl group is preferred; as the arylene group, a phenylene group or a naphthylene group may, for example, be mentioned, and a phenylene group is preferred; as the monovalent heterocycle group, a heterocycle group having aromaticity is preferred, a furyl group, a thienyl group or a pyridyl group may, for example, be mentioned, and a monocyclic aromatic heterocycle is particularly preferred; and as the bivalent heterocycle group, a heterocycle having aromaticity is preferred, and a pyridylene group or a thienylene group may, for example, be mentioned, and a monocyclic aromatic heterocycle is particularly preferred.

Among them, most preferably, each of $Ar^1$ and $Ar^2$ is a phenylene group, and each of $Ar^5$ and $Ar^6$ is a phenyl group.

Among groups represented by $R^{40}$ to $R^{47}$ and $Ar^1$ to $Ar^6$, the alkyl group, the aryl group, the aralkyl group and the heterocycle group may further have a substituent, and the substituent may, for example, be a cyano group; a nitro group; a hydroxyl group; a halogen atom such as a fluorine atom, a chlorine atom, a bromine atom or an iodine atom; an alkyl group such as a methyl group, an ethyl group, a propyl group, an isopropyl group, a butyl group, an isobutyl group, a s-butyl group, a t-butyl group, a pentyl group, a hexyl group, a cyclopentyl group or a cyclohexyl group; an alkoxyl group such as a methoxy group, an ethoxy group or a propyloxy group; an alkylthio group such as a methylthio group or an ethylthio group; an alkenyl group such as a vinyl group or an allyl group; an aralkyl group such as a benzyl group, a naphthylmethyl group or a phenethyl group; an aryloxy group such as a phenoxy group or a tolyloxy group; an arylalkoxyl group such as a benzyloxy group or a phenethyloxy group; an aryl group such as a phenyl group or a naphthyl group; an arylvinyl group such as a styryl group or a naphthylvinyl group; an acyl group such as an acetyl group or a benzoyl group; a dialkylamino group such as a dimethylamino group or a diethylamino group; a diarylamino group such as a diphenylamino group or a dinaphthylamino group; a diheterocycle amino group such as a diaralkylamino group such as a dibenzylamino group or a diphenethylamino group, a dipyridylamino group or a dithienylamino group; or a diallylamino group, or a substituted amino group in combination of the above substituents of the amino groups, such as a di-substituted amino group.

Further, these substituents may be bonded to each other to form a cyclic hydrocarbon group or a heterocycle group by means of a single bond, a methylene group, an ethylene group, a carbonyl group, a vinylidene group, an ethylenylene group, or the like.

Among them, as preferred substituents, a halogen atom, a cyano group, a hydroxyl group, a $C_{1-6}$ alkyl group, a $C_{1-6}$ alkoxyl group, a $C_{1-6}$ alkyl alkylthio group, a $C_{6-12}$ aryloxy group, a $C_{6-12}$ arylthio group and a $C_{2-8}$ dialkylamino group may be mentioned, and a halogen atom, a $C_{1-6}$ alkyl group and a phenyl group are more preferred, and a methyl group and a phenyl group are particularly preferred.

In the formula (10), each of $n^1$ to $n^4$ which are independent of one another, represents an integer of from 0 to 4, and preferably from 0 to 2, most preferably 1. Each of $m^1$ and $m^2$ represents 0 or 1, preferably 0.

In the formula (10), Q represents a direct bond or a bivalent residue, and preferred as the bivalent residue, a Group VI atom, an alkylene group which may have a substituent, an arylene group which may have a substituent, a cycloalkylidene group which may have a substituent or one having these groups bonded to each other, such as [—O-A-O—], [-A-O-A-], [—S-A-S—] or [-A-A-] (wherein A represents an arylene group which may have a substituent or an alkylene group which may have a substituent).

The alkylene group constituting Q is preferably one having a carbon number of from 1 to 6, and a methylene group and an ethylene group are particularly preferred. Further, as the cycloalkylidene group, one having a carbon number of from 5 to 8 is preferred, and a cyclopentylidene group and a cyclohexylidene group are more preferred. As the arylene group, one having a carbon number of from 6 to 14 is preferred, and a phenylene group and a naphthylene group are particularly preferred.

Further, these alkylene group, arylene group and cycloalkylidene groups may have a substituent, and as preferred substituents, a hydroxyl group, a nitro group, a cyano group, a halogen atom, a $C_{1-6}$ alkyl group, a $C_{1-6}$ alkenyl group and a $C_{6-14}$ aryl group may be mentioned.

These charge transport materials may be used alone or in combination as a mixture. Such a charge transport material is bonded to the binder resin to form the charge transport layer. The charge transport layer may be composed of a single layer or may be a laminate of a plurality of layers having different constituents or different compositions.

As for the ratio of the binder resin to the charge transport material, in general, the charge transport material is used in an amount of, generally from 30 to 200 parts by weight, preferably from 40 to 150 parts by weight, per 100 parts by weight of the binder resin.

Further, the film thickness is generally from 5 to 50 μm, preferably from 10 to 45 μm.

The charge transport layer may contain additives is such as known plasticizers, antioxidants, ultraviolet absorbers, electron-withdrawing compounds and leveling agents for improving the film-forming properties, flexibility, coating property, stain resistance, gas resistance, light fastness, and the like.

Examples of the antioxidant include a hindered phenol compound and a hindered amine compound.

In the case of the dispersion type photosensitive layer, the above-described charge generation material is dispersed in the charge transport medium having the above compounding ratio.

The particle size of the charge generation material to be used in such a case is required to be sufficiently small, and it is preferably 1 μm or less, and more preferably 0.5 μm or less. If the amount of the charge generation material to be dispersed in the photosensitive layer is too small, sufficient sensitivity cannot be obtained. Whereas, if it is too much, there occur detrimental effects such as a reduction in the triboelectricity, a reduction in the sensitivity, and the like. Accordingly, the charge generation material is used, for example, preferably in the range of from 0.5 to 50 wt %, and more preferably in the range of from 1 to 20 wt %.

The film thickness of the photosensitive layer to be used is generally from 5 to 50 μm, and preferably from 10 to 45 μm. It is also acceptable in this case that there are added therein known plasticizers for improving the film-forming properties, flexibility, mechanical strength, and the like, additives for controlling the residual potential, dispersant aids for improving the dispersion stability, leveling agents for improving the coating properties, surfactants, for example, a silicone oil, a fluorine-based oil, and other additives.

A protective layer may also be provided on the photosensitive layer for a purpose of preventing the wear of the photosensitive layer, or preventing or reducing the deterioration of the photosensitive layer due to the discharge product or the like arising from a charger or the like.

Further, the surface layer thereof may also contain fluorine-based resins, silicone resins, and the like for a purpose of reducing the frictional resistance or the abrasion on the surface of the photoreceptor. Further, it may also contain particles comprised of these resins, or particles of inorganic compounds.

Each of the layers constituting the photoreceptor is formed by coating the substrate by means of e.g. dip coating, spray coating, nozzle coating, bar coating, roll coating or blade coating.

As the method of forming each layer, a known method wherein materials to be contained in the layer are dissolved or dispersed in a solvent to obtain coating liquids, which are sequentially coated, may be employed.

A solvent or dispersion medium used for preparation of the coating liquid may, for example, be an alcohol such as methanol, ethanol, propanol or 2-methoxyethanol, an ether such as tetrahydrofuran, 1,4-dioxane or dimethoxyethane, an ester such as ethyl formate or ethyl acetate, a ketone such as acetone, methyl ethyl ketone or cyclohexanone, an aromatic hydrocarbon such as benzene, toluene or xylene, a chlorinated hydrocarbon such as dichloromethane, chloroform, 1,2-dichloroethane, 1,1,2-trichloroethane, 1,1,1-trichloroethane, tetrachloroethane, 1,2-dichloropropane or trichloroethylene, a nitrogen-containing compound such as n-butylamine, isopropanolamine, diethylamine, triethanolamine, ethylenediamine or triethylenediamine, or an aprotic polar solvent such as acetonitrile, N-methylpyrrolidone, N,N-dimethylformamide or dimethylsulfoxide, and they may be used alone or in combination as a mixture of at least two.

Here, in preparation of the coating liquid or the dispersion, in the case of the monolayer type photosensitive layer and in the case of the charge transport layer of the lamination type photosensitive layer, the solid content concentration is preferably at most 40 wt %, more preferably from 10 to 35 wt %, and the viscosity is preferably from 50 to 300 cps, and in the case of the charge generation layer of the lamination type photosensitive layer, the solid content concentration is preferably at most 15 wt %, more preferably from 1 to 10 wt %, and the viscosity is preferably from 0.1 to 10 cps.

Electrophotographic Apparatus

Although electrophotographic apparatus, such as copying machines, printers, and the like which use the electrophotographic photoreceptor of the present invention involve at least the respective steps of charging, exposure, development, and transfer, each step may be accomplished by using any of the conventionally used methods and apparatus. As for the charging step (charger), there may be used, for example, any of corotron or scorotron electrical charging in which a corona discharge is utilized, and contact electrical charging using a conductive roller or brush, a film, or the like. Of these techniques, in the electrical charging techniques using a corona discharge, the scorotron electrical charging is often used to hold the electrical potential in the dark place constant. As the development step, a commonly used method in which a magnetic or non-magnetic one-component developing agent, two-component developing agent, or the like is contacted or non-contacted to carry out the development may be used. As the transfer step, any of transfer method, any of transfer by a transfer belt, and the like may be adopted. The image transfer may be carried out directly onto a sheet of paper, an OHP film, or the like. Alternatively, an image may be transferred once onto an intermediate transfer member (in belt form or drum form), and then transferred onto a sheet of paper or an OHP film.

In general, after transfer, a fixing process for fixing the developing agent onto the sheet of paper or the like is employed. The fixing means may be commonly used thermal fixing or pressure fixing.

In addition to these processes, commonly used processes such as cleaning and charge removal may also be involved.

Now, the present invention will be described in further detail with reference to Preparation Examples, Examples and Comparative Examples. However, it should be understood that the present invention is by no means restricted to such specific Examples.

EXAMPLES

Preparation of Polyarylate Resin
Viscosity-average Molecular Weight

A polyarylate resin was dissolved in dichloromethane to prepare a solution with a concentration C of 6.00 g/l. By using a Ubbellohde capillary viscometer whereby the falling time t0 of a solvent (dichloromethane) is 136.16 seconds, the falling time t of a sample solution in a thermobath set at 20.0° C. was determined. The viscosity-average molecular weight mV was calculated in accordance with the following equation.

$$a=0.438\times\eta sp+1$$

$$b=100\times\eta sp/C$$

$$\eta=b/a$$

$$Mv=3207\times\eta^{1.205}$$

$$\eta sp=t/t0-1$$

$$C=6.00 \text{ (g/l)}$$

Preparation Example 1

Preparation of Polyarylate Resin A of Comparative Example 1

Sodium hydroxide (9.40 g) and water (673 ml) were weighed out in a 1 l beaker, and stirred and dissolved with nitrogen bubbling. Then, benzyltriethylammonium chloride (0.1164 g), bis(4-hydroxyphenyl)methane (17.89 g) and p-tert-butylphenol (0.2684 g) were added thereto, followed by stirring, and then the resulting alkaline aqueous solution was transferred into a 1 l reaction bath.

Separately, terephthalic acid chloride (18.34 g) was dissolved in dichloromethane (337 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Along with the dropwise addition, deposition of insoluble matters was confirmed in the reaction bath, and the deposition of insoluble matters increased along with the progress of dropwise addition. Stirring was further continued for 4 hours, and then acetic acid (3.1 ml) was added thereto, followed by stirring for 30 minutes. Thereafter, stirring was stopped, and an organic layer was separated together with the insoluble matters from an aqueous layer. This organic layer and the insoluble matters were washed with a 0.1 N sodium hydroxide aqueous solution (340 ml), and then washed with a 0.1 N hydrochloric acid (250 ml) two times, and further washed with water (250 ml) two times.

The precipitate obtained by pouring the organic layer and the insoluble matters after washing into methanol (2,250 ml) was taken out by filtration, and dried to obtain an aimed polyarylate resin A having constituents (2), (3), (4) and (8) in the above formula (1) as shown in the following Table 1. The obtained polyarylate resin A was insoluble in dichloromethane, and the viscosity-average molecular weight could not be measured.

Preparation Example 2

Preparation of Polyarylate Resin B of Comparative Example 2

Sodium hydroxide (8.48 g) and water (600 ml) were weighed out in a 1 l beaker, and stirred and dissolved with nitrogen bubbling. Then, benzyltriethylammonium chloride (0.1040 g), bis(4-hydroxyphenyl)methane (16.31 g) and p-tert-butylphenol (0.3548 g) were added thereto, followed by stirring, and then the resulting alkaline aqueous solution was transferred into a 2 l reaction bath.

Separately, terephthalic acid chloride (11.82 g) and isophthalic acid chloride (5.07 g) were dissolved in dichloromethane (300 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.8 ml) and dichloromethane (150 ml) were added thereto, followed by stirring for 30 minutes. Thereafter, stirring was stopped, and an organic layer was separated. This organic layer was washed with a 0.1 N sodium hydroxide aqueous solution (280 ml), and then washed with a 0.1 N hydrochloric acid (810 ml) two times, and further washed with water (810 ml) two times. The precipitate obtained by pouring the organic layer after washing into methanol (1,500 ml) was taken out by filtration, and dried to obtain an aimed polyarylate resin B having constituents (2), (3), (4) and (8) in the above formula (1) as shown in the following Table 1. The obtained polyarylate resin B was insoluble in dichloromethane, and the viscosity-average molecular weight could not be measured.

Preparation Example 3

Preparation of Polyarylate Resin C of Comparative Example 3

Sodium hydroxide (9.40 g) and water (673 ml) were weighed out in a 1 l beaker, and stirred and dissolved with nitrogen bubbling. Then, benzyltriethylammonium chloride (0.1164 g), bis(4-hydroxyphenyl)methane (17.89 g) and p-tert-butylphenol (0.2684 g) were added thereto, followed by stirring, and then the resulting alkaline aqueous solution was transferred into a 1 l reaction bath.

Separately, terephthalic acid chloride (9.17 g) and isophthalic acid chloride (9.17 g) were dissolved in dichloromethane (337 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (3.1 ml) was added thereto, followed by stirring for 30 minutes. Thereafter, stirring was stopped, and an organic layer was separated. This organic layer was washed with a 0.1 N sodium hydroxide aqueous solution (340 ml), and then washed with a 0.1 N hydrochloric acid (250 ml) two times, and further washed with water (250 ml) two times.

The precipitate obtained by pouring the organic layer after washing into methanol (2,250 ml) was taken out by filtration, and dried to obtain an aimed polyarylate resin C having constituents (2), (3), (4) and (8) in the above formula (1) as shown in the following Table 1. The obtained polyarylate resin C was insoluble in dichloromethane, and the viscosity-average molecular weight could not be measured.

Preparation Example 4

Preparation of Polyarylate Resin D of Comparative Example 4

An aimed polyarylate resin D having constituents (2), (3), (4) and (8) in the above formula (1) as shown in the following Table 1 was obtained in the same manner as in Preparation Example 3 except that (2-hydroxyphenyl)(4-hydroxyphenyl)methane (17.89 g) was used instead of bis- (4-hydroxyphenyl)methane (17.89 g). The viscosity-average molecular weight of the obtained polyarylate resin D was 16,400.

Preparation Example 5

Preparation of Polyarylate Resin E of Comparative Example 5

Sodium hydroxide (5.63. g) and water (404 ml) were weighed out in a 1 l beaker, and stirred and dissolved with nitrogen bubbling. Then, benzyltriethylammonium chloride (0.0697 g), bis(2-hydroxyphenyl)methane (10.72 g) and p-tert-butylphenol (0.1908 g) were added thereto, followed by stirring, and then the resulting alkaline aqueous solution was transferred into a 1 l reaction bath.

Separately, terephthalic acid chloride (10.99 g) was dissolved in dichloromethane (202 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (1.9 ml) was added thereto, followed by stirring for 30 minutes. Thereafter, stirring was stopped, and an organic layer was separated. The organic layer was washed with a 0.1 N sodium hydroxide aqueous solution (200 ml), and then washed with a 0.1 N hydrochloric acid (150 ml) two times, and further washed with water (150 ml) two times.

The precipitate obtained by pouring the organic layer after washing into methanol (2,000 ml) was taken out by filtration, and dried to obtain an aimed polyarylate resin E having constituents (2), (3), (4) and (8) in the above formula (1) as shown in the following Table 1. The obtained polyarylate resin E was insoluble in dichloromethane, and the viscosity-average molecular weight could not be measured.

Preparation Example 6

Preparation of Polyarylate Resin F of Example 1

Sodium hydroxide (15.62 g) and water (1,122 ml) were weighed out in a 1 l beaker, and stirred and dissolved with nitrogen bubbling. Then, benzyltriethylammonium chloride (0.1953 g), bis-(4-hydroxyphenyl)methane (10.30 g), (2-hydroxyphenyl)(4-hydroxyphenyl)methane (14.13 g), bis-(2-hydroxyphenyl)methane (5.00 g) and p-tert-butylphenol (0.8833 g) were added thereto, followed by stirring, and then the resulting alkaline aqueous solution was transferred into a 2 l reaction bath.

Separately, terephthalic acid chloride (30.48 g) was dissolved in dichloromethane (561 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (5.2 ml) was added thereto, followed by stirring for 30 minutes. Thereafter, stirring was stopped, and an organic layer was separated. This organic layer was washed with a 0.1 N sodium hydroxide aqueous solution (560 ml), and then washed with a 0.1 N hydrochloric acid (420 ml) two times, and further washed with water (420 ml) two times.

The precipitate obtained by pouring the organic layer after washing into methanol (3,250 ml) was taken out by filtration, and dried to obtain an aimed polyarylate resin F having constituents (2), (3), (4) and (8) in the above formula (1) as shown in the following Table 1. The viscosity-average molecular weight of the obtained polyarylate resin F was 19,100.

Preparation Example 7

Preparation of Polyarylate Resin G of Example 2

Sodium hydroxide (7.82 g) and water (561 ml) were weighed out in a 1 l beaker, and stirred and dissolved with nitrogen bubbling. Then, benzyltriethylammonium chloride (0.0973 g), bis-(4-hydroxyphenyl)methane (5.19 g), (2-hydroxyphenyl)(4-hydroxyphenyl)methane (7.11 g), bis-(2-hydroxyphenyl)methane (2.52 9) and p-tert-butylphenol (0.3334 g) were added thereto, followed by stirring, and then the resulting alkaline aqueous solution was transferred into a 1 l reaction bath.

Separately, terephthalic acid chloride (10.68 g) and isophthalic acid chloride (4.58 g) were dissolved in dichloromethane (281 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.6 ml) was added thereto, followed by stirring for 30 minutes. Thereafter, stirring was stopped, and an organic layer was separated. This organic layer was washed with a 0.1 N sodium hydroxide aqueous solution (280 ml), and then washed with a 0.1 N hydrochloric acid (210 ml) two times, and further washed with water (210 ml) two times.

The precipitate obtained by pouring the organic layer after washing into methanol (1,700 ml) was taken out by filtration, and dried to obtain an aimed polyarylate resin G having constituents (2), (3), (4) and (8) in the above formula (1) as shown in the following Table 1. The viscosity-average molecular weight of the obtained polyarylate resin G was 16,700.

Preparation Example 8

Preparation of Polyarylate Resin H of Example 3

An aimed polyarylate resin H having constituents (2), (3), (4) and (8) in the above formula (1) as shown in the following Table 1 was obtained in the same manner as in Preparation Example 7 except that the amounts of terephthalic acid chloride (7.63 g) and isophthalic acid chloride (7.63 g) were changed. The viscosity-average molecular weight of the obtained polyarylate resin H was 14,900.

Preparation Example 9

Preparation of Polyarylate Resin I of Example 4

An aimed polyarylate resin I having constituents (2), (3), (4) and (8) in the above formula (1) as shown in the following Table 1 was obtained in the same manner as in Preparation Example 7 except that no terephthalic acid chloride was added, and the amount of isophthalic acid chloride (15.26 g) was changed. The viscosity-average molecular weight of the obtained polyarylate resin I was 12,500.

Preparation Example 10

Preparation of Polyarylate Resin J of Example 5

Sodium hydroxide (9.40 g) and water (673 ml) were weighed out in a 1 l beaker, and stirred and dissolved with nitrogen bubbling. Then, benzyltriethylammonium chloride (0.1164 g), (2-hydroxyphenyl)(4-hydroxyphenyl)methane (8.95 g), bis-(2-hydroxyphenyl)methane (8.95 g) and p-tert-butylphenol (0.2684 g) were added thereto, followed by stirring, and then the resulting alkaline aqueous solution was transferred into a 1 l reaction bath.

Separately, terephthalic acid chloride (9.17 g) and isophthalic acid chloride (9.17 g) were dissolved in dichloromethane (337 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (3.1 ml) was added thereto, followed by stirring for 30 minutes. Thereafter, stirring was stopped, and an organic layer was separated. The organic layer was washed with a 0.1 N sodium hydroxide aqueous solution (340 ml), and then washed with a 0.1 N hydrochloric acid (250 ml) two times, and further washed with water (250 ml) two times. The precipitate obtained by pouring the organic layer after washing into methanol (2,250 ml) was taken out by filtration, and dried to obtain an aimed polyarylate resin J having constituents (2), (3), (4) and (8) in the above formula (1) as shown in the following Table 1. The viscosity-average molecular weight of the obtained polyarylate resin J was 8,600.

TABLE 1

| | Bisphenol component | | | Dicarboxylic acid component (8) | | Viscosity average molecular |
|---|---|---|---|---|---|---|
| | (2) p, p'-BPF | (3) o, p'-BPF | (4) o, o'-BPF | a TPA | b IPA | weight Mv |
| Resin A | 100 | 0 | 0 | 100 | 0 | — |
| Resin B | 100 | 0 | 0 | 70 | 30 | — |
| Resin C | 100 | 0 | 0 | 50 | 50 | — |
| Resin D | 0 | 100 | 0 | 100 | 0 | 16,400 |
| Resin E | 0 | 0 | 100 | 100 | 0 | — |
| Resin F | 35 | 48 | 17 | 100 | 0 | 19,100 |
| Resin G | 35 | 48 | 17 | 70 | 30 | 16,700 |
| Resin H | 35 | 48 | 17 | 50 | 50 | 14,900 |
| Resin I | 35 | 48 | 17 | 0 | 100 | 12,500 |
| Resin J | 0 | 50 | 50 | 50 | 50 | 8,600 |

Preparation Example 11

Preparation of Polyarylate Resin K of Comparative Example 6

Sodium hydroxide (7.26 g) and water (600 ml) were weighed out in a 1 l beaker, and stirred and dissolved with nitrogen bubbling. Then, p-tert-butylphenol (0.5463 g), benzyltriethylammonium chloride (0.089 g) and bis(4-hydroxy-3,5-dimethylphenyl)methane[tetramethylbisphenol F] (17.86 g) were added thereto, followed by stirring, and then the resulting alkaline aqueous solution was transferred into a 1 l reaction bath.

Separately, terephthalic acid chloride (14.45 g) was dissolved in dichloromethane (300 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over one hour. Stirring was further continued for 3 hours, and then acetic acid (2.39 ml) and dichloromethane (150 ml) were added thereto, followed by stirring for 30 minutes. Thereafter, stirring was stopped, and an organic layer was separated. The organic layer was washed with a 0.1 N sodium hydroxide aqueous solution (340 ml) once, and then washed with a 0.1 N hydrochloric acid (340 ml) two times, and further washed with water (340 ml) two times.

The precipitate obtained by pouring the organic layer after washing into methanol (2,500 ml) was taken out by filtration, and dried to obtain an aimed polyarylate resin K having constituents (2), (3), (4), (6) and (8) in the above formula (1) as shown in the following Table 2. The viscosity-average molecular weight of the obtained polyarylate resin K was 32,220.

Preparation Example 12

Preparation of Polyarylate Resin L of Comparative Example 7

Sodium hydroxide (5.20 g) and water (400 ml) were weighed out in a 1 l beaker, and stirred and dissolved with nitrogen bubbling. Then, p-tert-butylphenol (0.2173 g), benzyltriethylammonium chloride (0.0647 g). a bis(4-hydroxy-3,5-dimethylphenyl)methane[tetramethylbisphenol is F] (6.31 g) and bis(4-hydroxyphenyl)methane[bisphenol F] (4.93 g) were added thereto, followed by stirring, and then the resulting alkaline aqueous solution was transferred into a 1 l reaction bath.

Separately, terephthalic acid chloride (10.15 g) was dissolved in dichloromethane (200 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over one hour. Stirring was further continued for 3 hours, and then acetic acid (1.71 ml) and dichloromethane (100 ml) were added thereto, followed by stirring for 30 minutes. Thereafter, stirring was stopped, and an organic layer was separated. The organic layer was washed with a 0.1 N sodium hydroxide aqueous solution (210 ml) once, and then washed with a 0.1 N hydrochloric acid (210 ml) two times, and further washed with water (210 ml) two times.

The precipitate obtained by pouring the organic layer after washing into methanol (2,000 ml) was taken out by filtration, and dried to obtain an aimed polyarylate resin L having constituents (2), (3), (4), (6) and (8) in the above formula (1) as shown in the following Table 2. The viscosity-average molecular weight of the obtained polyarylate resin L was 33,700.

Preparation Example 13

Preparation of Polyarylate Resin M of Comparative Example 8

Sodium hydroxide (15.62 g) and water (1,120 ml) were weighed out in a 1 l beaker, and stirred and dissolved with nitrogen bubbling. Then, benzyltriethylammonium chloride (0.1953 g) and a mixture of bis(4-hydroxyphenyl)methane [p,p'-BPF], (2-hydroxyphenyl)(4-hydroxyphenyl)methane [o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (29.44 g) were added thereto, followed by stirring, and then the resulting alkaline aqueous solution was transferred into a 2 l reaction bath. Then, p-tert-butylphenol (0.8833 g) was added thereto.

Separately, terephthalic acid chloride (14.45 g) was dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (5.15 ml) was added thereto, followed by stirring for 30 minutes. Thereafter, stirring was stopped, and an organic layer was separated. The organic layer was washed with a 0.1 N sodium hydroxide aqueous solution (560 ml) once, and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin M having constituents (2), (3), (4), (6) and (8) in the above formula (1) as shown in the following Table 2. The viscosity-average molecular weight of the obtained polyarylate resin M was 19,100.

Preparation Example 14

Preparation of Polyarylate Resin N of Comparative Example 9

Sodium hydroxide (7.44 g) and water (560 ml) were weighed out in a 1 l beaker, and stirred and dissolved with nitrogen bubbling. Then, benzyltriethylammonium chloride (0.0930 g), bis(4-hydroxy-3,5-dimethylphenyl)methane [tetramethylbisphenol F] (5.39 g), bis(4-hydroxyphenyl)methane[p,p'-BPF] (6.87 g) and (2-hydroxyphenyl)(4-hydroxyphenyl)methane[o,p'-BPF] (2.95 g) were added thereto, followed by stirring, and then the resulting alkaline aqueous solution was transferred into a 1 l reaction bath. Then, 4-tert-butyl-2,6-dimethylphenol (0.4209 g) was added thereto.

Separately, terephthalic acid chloride (14.52 g) was dissolved in dichloromethane (280 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.45 ml) was added thereto, followed by stirring for 30 minutes. Thereafter, stirring was stopped, and an organic layer was separated. The organic layer was washed with a 0.1 N sodium hydroxide aqueous solution (280 ml) once, and then washed with a 0.1 N hydrochloric acid (210 ml) two times, and further washed with water (210 ml) two times.

The precipitate obtained by pouring the organic layer after washing into methanol (1,500 ml) was taken out by filtration, and dried to obtain an aimed polyarylate resin N having constituents (2), (3), (4), (6) and (8) in the above formula (1) as shown in the following Table 2. The viscosity-average molecular weight of the obtained polyarylate resin N was 33,500.

Preparation Example 15

Preparation of Polyarylate Resin O of Example 6

Sodium hydroxide (13.62 g) and water (1,120 ml) were weighed out in a 1 l beaker, and stirred and dissolved with nitrogen bubbling. Then, benzyltriethylammonium chloride (0.1703 g), bis(4-hydroxy-3,5-dimethylphenyl)methane [tetramethylbisphenol F] (29.58 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (2.57 g) were added thereto, followed by stirring, and then the resulting alkaline aqueous solution was transferred into a 2 l reaction bath. Then, 2,3,6-trimethylphenol (0.6984 g) was added thereto.

Separately, terephthalic acid chloride (26.58 g) was dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (4.49 ml) was added thereto, followed by stirring for 30 minutes. Thereafter, stirring was stopped, and an organic layer was separated. The organic layer was washed with a 0.1 N sodium hydroxide aqueous solution (560 ml) once, and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin O having constituents (2), (3), (4), (6) and (8) in the above formula (1) as shown in the following Table 2. The viscosity-average molecular weight of the obtained polyarylate resin O was 40,700.

Preparation Example 16

Preparation of Polyarylate Resin P of Example 7

Sodium hydroxide (6.88 g) and water (560 ml) were weighed out in a 1 l beaker, and stirred and dissolved with nitrogen bubbling. Then, benzyltriethylammonium chloride (0.086 g), bis(4-hydroxy-3,5-dimethylphenyl)methane [tetramethylbisphenol F] (13.28 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (2.59 g) were added thereto, followed by stirring, and then the resulting alkaline aqueous solution was transferred into a 1 l reaction bath. Then, 4-tert-butyl-2,6-dimethylphenol (0.4617 g) was added thereto.

Separately, terephthalic acid chloride (13.43 g) was dissolved in dichloromethane (280 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 5 hours, and then acetic acid (2.27 ml) was added thereto, followed by stirring for 30 minutes. Thereafter, stirring was stopped, and an organic layer was separated. The organic layer was washed with a 0.1 N sodium hydroxide aqueous solution (280 ml) once, and then washed with a 0.1 N hydrochloric acid (210 ml) two times, and further washed with water (210 ml) two times.

The precipitate obtained by pouring the organic layer after washing into methanol (1,500 ml) was taken out by filtration, and dried to obtain an aimed polyarylate resin P having constituents (2), (3), (4), (6) and (8) in the above formula (1) as shown in the following Table 2. The viscosity-average molecular weight of the obtained polyarylate resin P was 33,800.

Preparation Example 17

Preparation of Polyarylate Resin Q of Example 8

Sodium hydroxide (14.01 g) and water (1,120 ml) were weighed out in a 1 l beaker, and stirred and dissolved with nitrogen bubbling. Then, benzyltriethylammonium chloride (0.1744 g), bis(4-hydroxy-3,5-dimethylphenyl)methane [tetramethylbisphenol F] (23.79 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (7.96 g) were added thereto, followed by stirring, and then the resulting alkaline aqueous solution was transferred into a 2 l reaction bath. Then, 2,6-dimethyl-4-tert-butyl-phenol (0.712 g) was added thereto.

Separately, terephthalic acid chloride (27.35 g) was dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (4.62 ml) was added thereto, followed by stirring for 30 minutes. Thereafter, stirring was stopped, and an organic layer was separated. The organic layer was washed with a 0.1 N sodium hydroxide aqueous solution (560 ml) once, and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin Q having constituents (2), (3), (4), (6) and (8) in the above formula (1) as shown in the following Table 2. The viscosity-average molecular weight of the obtained polyarylate resin Q was 36,700.

Preparation Example 18

Preparation of Polyarylate Resin R of Example 9

Sodium hydroxide (14.46 g) and water (1,120 ml) were weighed out in a 1 l beaker, and stirred and dissolved with nitrogen bubbling. Then, benzyltriethylammonium chloride (0.1791 g), bis(4-hydroxy-3,5-dimethylphenyl)methane [tetramethylbisphenol F] (17.62 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (13.76 g) were added thereto, followed by stirring, and then the resulting alkaline aqueous solution was transferred into a 2 l reaction bath. Then, p-tert-butylphenol (0.4129 g) was added thereto.

Separately, terephthalic acid chloride (28.22 g) was dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (4.77 ml) was added thereto, followed by stirring for 30 minutes. Thereafter, stirring was stopped, and an organic layer was separated. The organic layer was washed with a 0.1 N sodium hydroxide aqueous solution (560 ml) once, and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin R having constituents (2), (3), (4), (6) and (8) in the above formula (1) as shown in the following Table 2. The viscosity-average molecular weight of the obtained polyarylate resin R was 29,800.

Preparation Example 19

Preparation of Polyarylate Resin S of Example 10

Sodium hydroxide (14.92 g) and water (1,120 ml) were weighed out in a 1 l beaker, and stirred and dissolved with nitrogen bubbling. Then, benzyltriethylammonium chloride (0.1848 g), bis(4-hydroxy-3,5-dimethylphenyl)methane [tetramethylbisphenol F] (10.91 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (19.88 g) were added thereto, followed by stirring, and then the resulting alkaline aqueous solution was transferred into a 2 l reaction bath. Then, p-tert-butylphenol (0.4260 g) was added thereto.

Separately, terephthalic acid chloride (29.11 g) was dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (4.92 ml) was added thereto, followed by stirring for 30 minutes. Thereafter, stirring was stopped, and an organic layer was separated. The organic layer was washed with a 0.1 N sodium hydroxide aqueous solution (560 ml) once, and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin S having constituents (2), (3), (4), (6) and (8) in the above formula (1) as shown in the following Table 2. The viscosity-average molecular weight of the obtained polyarylate resin S was 27,200.

Preparation Example 20

Preparation of Polyarylate Resin T of Example 11

Sodium hydroxide (7.19 g) and water (560 ml) were weighed out in a 1 l beaker, and stirred and dissolved with nitrogen bubbling. Then, benzyltriethylammonium chloride (0.0899 g), bis(4-hydroxy-3,5-dimethylphenyl)methane

[tetramethylbisphenol F] (8.68 g), bis(4-hydroxyphenyl)methane[p,p'-BPF] (4.75 g) and (2-hydroxyphenyl)(4-hydroxyphenyl)methane[o,p'-BPF] (2.03 g) were added thereto, followed by stirring, and then the resulting alkaline aqueous solution was transferred into a 1 l reaction bath. Then, 4-tert-butyl-2,6-dimethylphenol (0.4827 g) was added thereto.

Separately, terephthalic acid chloride (14.04 g) was dissolved in dichloromethane (280 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.37 ml) was added thereto, followed by stirring for 30 minutes. Thereafter, stirring was stopped, and an organic layer was separated. The organic layer was washed with a 0.1 N sodium hydroxide aqueous solution (280 ml) once, and then washed with a 0.1 N hydrochloric acid (210 ml) two times, and further washed with water (210 ml) two times.

The precipitate obtained by pouring the organic layer after washing into methanol (1,500 ml) was taken out by filtration, and dried to obtain an aimed polyarylate resin T having constituents (2), (3), (4), (6) and (8) in the above formula (1) as shown in the following Table 2. The viscosity-average molecular weight of the obtained polyarylate resin T was 33,300.

Preparation Example 21

Preparation of Polyarylate Resin U of Example 12

Sodium hydroxide (14.46 g) and water (1,120 ml) were weighed out in a 1 l beaker, and stirred and dissolved with nitrogen bubbling. Then, benzyltriethylammonium chloride (0.1791 g), bis(4-hydroxy-3,5-dimethylphenyl)methane [tetramethylbisphenol F] (17.62 g), a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (6.88 g) and bis(4-hydroxyphenyl)methane[p,p'-BPF] (6.88 g) were added thereto, followed by stirring, and then the resulting alkaline aqueous solution was transferred into a 1 l reaction bath. Then, 4-tert-butyl-phenol (0.4129 g) was added thereto.

Separately, terephthalic acid chloride (28.22 g) was dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (4.77 ml) was added thereto, followed by stirring for 30 minutes. Thereafter, stirring was stopped, and an organic layer was separated. The organic layer was washed with a 0.1 N sodium hydroxide aqueous solution (560 ml) once, and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin U having constituents (2), (3), (4), (6) and (8) in the above formula (1) as shown in the following Table 2. The viscosity-average molecular weight of the obtained polyarylate resin U was 44,700.

Preparation Example 22

Preparation of Polyarylate Resin V of Example 13

Sodium hydroxide (7.22 g) and water (560 ml) were weighed out in a 1 l beaker, and stirred and dissolved with nitrogen bubbling. Then, benzyltriethylammonium chloride (0.0894 g), bis(4-hydroxy-3,5-dimethylphenyl)methane [tetramethylbisphenol F] (8.79 g), bis(4-hydroxyphenyl)methane[p,p'-BPF] (3.44 g) and bis(2-hydroxyphenyl)methane[o,o'-BPF] (3.44 g) were added thereto, followed by stirring, and then the resulting alkaline aqueous solution was transferred into a 1 l reaction bath. Then, 4-tert-butyl-2,6-dimethylphenol (0.2446 g) was added thereto.

Separately, terephthalic acid chloride (14.09 g) was dissolved in dichloromethane (280 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.38 ml) was added thereto, followed by stirring for 30 minutes. Thereafter, stirring was stopped, and an organic layer was separated. The organic layer was washed with a 0.1 N sodium hydroxide aqueous solution (280 ml) once, and then washed with a 0.1 N hydrochloric acid (210 ml) two times, and further washed with water (210 ml) two times.

The precipitate obtained by pouring the organic layer after washing into methanol (1,500 ml) was taken out by filtration, and dried to obtain an aimed polyarylate resin V having constituents (2), (3), (4), (6) and (8) in the above formula (1) as shown in the following Table 2. The viscosity-average molecular weight of the obtained polyarylate resin V was 46,400.

Preparation Example 23

Preparation of Polyarylate Resin W of Example 14

Sodium hydroxide (5.20 g) and water (400 ml) were weighed out in a 1 l beaker, and stirred and dissolved with nitrogen bubbling. Then, 4-tert-butylphenol (0.2173 g), benzyltriethylammonium chloride (0.0647 g), bis(4-hydroxy-3,5-dimethylphenyl)methane[=TmBPF] (6.31 g) and bis(2-hydroxyphenyl)methane[=o,o'-BPF] (4.93 g) were added thereto in this order, followed by stirring, and then the resulting alkaline aqueous solution was transferred into a 2 l reaction bath.

Separately, terephthalic acid chloride (5.07 g) and isophthalic acid chloride (5.07 g) were dissolved in dichloromethane (200 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over one hour. Stirring was further continued for 3 hours, and then acetic acid (1.71 ml), dichloromethane (100 ml) and water (50 ml) were added thereto, followed by stirring for 30 minutes. Thereafter, stirring was stopped, and an organic layer was separated. The organic layer was poured into a 0.1 N sodium hydroxide aqueous solution (450 ml) and stirred, followed by separation for washing, and then washed with a 0.1 N hydrochloric acid (450 ml) two times, and further washed with water (450 ml) two times.

The precipitate obtained by diluting the organic layer after washing with 200 ml of methylene chloride and then pouring the diluted organic layer into methanol (1,500 ml) was taken out by filtration, and dried to obtain an aimed polyarylate resin W. The viscosity-average molecular weight of the obtained polyarylate resin W was 33,600.

Preparation Example 24

Preparation of Polyarylate Resin X of Example 15

An aimed polyarylate resin X having constituents (2), (3), (4), (6) and (8) in the above formula (1) as shown in the following Table 2 was obtained in the same manner as in Preparation Example 23 except that (2-hydroxyphenyl)(4-hydroxyphenyl)methane was used instead of bis-(2-hydroxyphenyl)methane. The viscosity-average molecular weight of the obtained polyarylate resin X was 38,200.

sodium hydroxide aqueous solution (400 ml), and then washed with a 0.1 N hydrochloric acid (400 ml) two times, and further washed with water (400 ml) two times.

The precipitate obtained by pouring the organic layer after washing into methanol (1,500 ml) was taken out by filtration, and dried to obtain an aimed polyarylate resin a having constituents (2), (3), (4), (6) and (8) in the above formula (1) as shown in the following Table 3. The viscosity-average molecular weight of the obtained polyarylate resin a was 40,700.

Preparation Example 26

Preparation of Polyarylate Resin b of Example 16

Sodium hydroxide (9.02 g) and water (670 ml) were weighed out in a 1 l beaker, and stirred and dissolved with nitrogen bubbling. Then, benzyltriethylammonium chloride (0.1117 g), 2,2-bis(4-hydroxyphenyl)propane[bisphenol A] (9.79 g) and a mixture of bis(4-hydroxyphenyl)methane[p,p'-BPF], (2-hydroxyphenyl)(4-hydroxyphenyl)methane[o,

TABLE 2

| | Bisphenol component | | | | Dicarboxylic acid component (8) | | Viscosity average molecular |
|---|---|---|---|---|---|---|---|
| | (2) p, p'-BPF | (3) o, p'-BPF | (4) o, o'-BPF | (6) Tm-BPF | a TPA | b IPA | weight Mv |
| Resin K | 0 | 0 | 0 | 100 | 100 | 0 | 32,200 |
| Resin L | 50 | 0 | 0 | 50 | 100 | 0 | 33,700 |
| Resin M | 35 | 48 | 17 | 0 | 100 | 0 | 19,100 |
| Resin N | 49 | 21 | 0 | 30 | 100 | 0 | 33,500 |
| Resin O | 3.5 | 4.8 | 1.7 | 90 | 100 | 0 | 40,700 |
| Resin P | 7 | 9.6 | 3.4 | 80 | 100 | 0 | 33,800 |
| Resin Q | 10.5 | 14.4 | 5.1 | 70 | 100 | 0 | 36,700 |
| Resin R | 17.5 | 24 | 8.5 | 50 | 100 | 0 | 29,800 |
| Resin S | 24.5 | 33.6 | 11.9 | 30 | 100 | 0 | 27,200 |
| Resin T | 35 | 15 | 0 | 50 | 100 | 0 | 33,300 |
| Resin U | 33.75 | 12 | 4.25 | 50 | 100 | 0 | 44,700 |
| Resin V | 25 | 0 | 25 | 50 | 100 | 0 | 46,400 |
| Resin W | 0 | 0 | 50 | 50 | 100 | 0 | 23,600 |
| Resin X | 0 | 50 | 0 | 50 | 100 | 0 | 38,200 |

Preparation Example 25

Preparation of Polyarylate Resin a of Comparative Example 10

Sodium hydroxide (5.55 g) and water (430 ml) were weighed out in a 1 l beaker, and stirred and dissolved with nitrogen bubbling. Then, p-tert-butylphenol (0.2321 g), benzyltriethylammonium chloride (0.0681 g) and 2,2-bis(4-hydroxyphenyl)propane[bisphenol A] (12.18 g) were added thereto, followed by stirring, and then the resulting alkaline aqueous solution was transferred into a 1 l reaction bath.

Separately, terephthalic acid chloride (5.52 g) and isophthalic acid chloride (5.52 g) were dissolved in dichloromethane (210 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over one hour. Stirring was further continued for 3 hours, and then acetic acid (1.83 ml) and dichloromethane (100 ml) were added thereto, followed by stirring for 30 minutes. Thereafter, stirring was stopped, and an organic layer was separated. The organic layer was washed with a 0.1 N p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (8.59 g) were added thereto, followed by stirring, and then the resulting alkaline aqueous solution was transferred into a 2 l reaction bath. Then, p-tert-butylphenol (0.2577 g) was added thereto.

Separately, terephthalic acid chloride (8.80 g) and isophthalic acid chloride (8.80 g) were dissolved in dichloromethane (340 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.97 ml) was added thereto, followed by stirring for 30 minutes. Thereafter, stirring was stopped, and an organic layer was separated. The organic layer was washed with a 0.1 N sodium hydroxide aqueous solution (340 ml), and then washed with a 0.1 N hydrochloric acid (250 ml) two times, and further washed with water (250 ml) two times.

The precipitate obtained by pouring the organic layer after washing into methanol (2,500 ml) was taken out by filtration, and dried to obtain an aimed polyarylate resin b having constituents (2), (3), (4), (6) and (8) in the above formula (1) as shown in the following Table 3. The viscosity-average molecular weight of the obtained polyarylate resin b was 39,100.

Preparation Example 27

Preparation of Polyarylate Resin c of Comparative Example 11

Sodium hydroxide (4.51 g) and water (400 ml) were weighed out in a 1 l beaker, and stirred and dissolved with nitrogen bubbling. Then, p-tert-butylphenol (0.3307 g), benzyltriethylammonium chloride (0.0567 g) and 2,2-bis(4-hydroxy-3,5-dimethylphenyl)propane[tetramethylbisphenol A] (11.99 g) were added thereto, followed by stirring, and then the resulting alkaline aqueous solution was transferred into a 1 l reaction bath.

Separately, terephthalic acid chloride (8.80 g) was dissolved in dichloromethane (200 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over one hour. Stirring was further is continued for 3 hours, and then acetic acid (1.49 ml) and dichloromethane (100 ml) were added thereto, followed by stirring for 30 minutes. Thereafter, stirring was stopped, and an organic layer was separated. The organic layer was washed with a 0.1 N sodium hydroxide aqueous solution (230 ml), and then washed with a 0.1 N hydrochloric acid (230 ml) two times, and further washed with water (230 ml) two times.

The precipitate obtained by pouring the organic layer after washing into methanol (1,500 ml) was taken out by filtration, and dried to obtain an aimed polyarylate resin c having constituents (2), (3), (4), (6) and (8) in the above formula (1) as shown in the following Table 3. The viscosity-average molecular weight of the obtained polyarylate resin c was 23,200.

Preparation Example 28

Preparation of Polyarylate Resin d of Example 17

Sodium hydroxide (5.01 g) and water (400 ml) were weighed out in a 1 l beaker, and stirred and dissolved with nitrogen bubbling. Then, benzyltriethylammonium chloride (0.0621 g), 2,2-bis(4-hydroxy-3,5-dimethylphenyl)propane [tetramethylbisphenol A] (6.77 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (4.77 g) were added thereto, followed by stirring, and then the resulting alkaline aqueous solution was transferred into a 2 l reaction bath. Then, p-tert-butylphenol (0.1431 g) was added thereto.

Separately, terephthalic acid chloride (9.78 g) was dissolved in dichloromethane (200 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over one hour. Stirring was further continued for 3 hours, and then acetic acid (1.65 ml) was added thereto, followed by stirring for 30 minutes. Thereafter, stirring was stopped, and an organic layer was separated. The organic layer was washed with a 0.1 N sodium hydroxide aqueous solution (200 ml) once, and then washed with a 0.1 N hydrochloric acid (150 ml) two times, and further washed with water (150 ml) two times.

The precipitate obtained by pouring the organic layer after washing into methanol (1,000 ml) was taken out by filtration, and dried to obtain an aimed polyarylate resin d having constituents (2), (3), (4), (6) and (8) in the above formula (1) as shown in the following Table 3. The viscosity-average molecular weight of the obtained polyarylate resin d was 19,400.

Preparation Example 29

Preparation of Polyarylate Resin e of Comparative Example 12

Sodium hydroxide (4.83 g) and water (400 ml) were weighed out in a 1 l beaker, and stirred and dissolved with nitrogen bubbling. Then, p-tert-butylphenol (0.2018 g), benzyltriethylammonium chloride (0.0601 g) and 2,2-bis(4-hydroxy-3-methylphenyl)propane[bisphenol C] (11.72 g) were added thereto, followed by stirring, and then the resulting alkaline aqueous solution was transferred into a 1 l reaction bath.

Separately, terephthalic acid chloride (4.71 g) and isophthalic acid chloride (4.71 g) were dissolved in dichloromethane (200 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over one hour. Stirring was further continued for 3 hours, and then acetic acid (1.59 ml) and dichloromethane (100 ml) were added thereto, followed by stirring for 30 minutes. Thereafter, stirring was stopped, and an organic layer was separated. The organic layer was washed with a 0.1 N sodium hydroxide aqueous solution (450 ml), and then washed with a 0.1 N hydrochloric acid (450 ml) two times, and further washed with water (450 ml) two times.

The precipitate obtained by pouring the organic layer after washing into methanol (1,000 ml) was taken out by filtration, and dried to obtain an aimed polyarylate resin e having constituents (2), (3), (4), (6) and (8) in the above formula (1) as shown in the following Table 3. The viscosity-average molecular weight of the obtained polyarylate resin e was 40,000.

Preparation Example 30

Preparation of Polyarylate Resin f of Example 18

Sodium hydroxide (8.67 g) and water (670 ml) were weighed out in a 1 l beaker, and stirred and dissolved with nitrogen bubbling. Then, benzyltriethylammonium chloride (0.1078 g), 2,2-bis(4-hydroxy-3-methylphenyl)propane [bisphenol C] (10.51 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (8.21 g) were added thereto, followed by stirring, and then the resulting alkaline aqueous solution was transferred into a 2 l reaction bath. Then, p-tert-butylphenol (0.3694 g) was added thereto.

Separately, terephthalic acid chloride (8.46 g) and isophthalic acid chloride (8.46 g) were dissolved in dichloromethane (340 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.86 ml) was added thereto, followed by stirring for 30 minutes. Thereafter, stirring was stopped, and an organic layer was separated. The organic layer was washed with a 0.1 N sodium hydroxide aqueous solution (340 ml) once, and then washed with a 0.1 N hydrochloric acid (250 ml) two times, and further washed with water (250 ml) two times.

The precipitate obtained by pouring the organic layer after washing into methanol (1,750 ml) was taken out by filtration, and dried to obtain an aimed polyarylate resin f having constituents (2), (3), (4), (6) and (8) in the above formula (1) as shown in the following Table 3. The viscosity-average molecular weight of the obtained polyarylate resin f was 16,300.

Preparation Example 31

Preparation of Polyarylate Resin g of Example 19

The same polymerization operation as in Preparation Example 30 was carried out except that terephthalic acid chloride (16.92 g) was used instead of terephthalic acid chloride (8.46 g) and isophthalic acid chloride (8.46 g).

An aimed polyarylate resin g having constituents (2), (3), (4), (6) and (8) in the above formula (1) as shown in the following Table 3 was obtained. The viscosity-average molecular weight of the obtained polyarylate resin g was 23,500.

Preparation Example 32

Preparation of Polyarylate Resin h of Comparative Example 13

Sodium hydroxide (4.69 g) and water (400 ml) were weighed out in a 1 l beaker, and stirred and dissolved with nitrogen bubbling. Then, p-tert-butylphenol (0.1958 g), benzyltriethylammonium chloride (0.0583 g) and 1,1-bis(4-hydroxyphenyl)cyclohexane[bisphenol Z] (11.90 g) were added thereto, followed by stirring, and then the resulting alkaline aqueous solution was transferred into a 1 l reaction bath.

Separately, terephthalic acid chloride (4.57 g) and isophthalic acid chloride (4.57 g) were dissolved in dichloromethane (200 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from is the dropping funnel over one hour. Stirring was further continued for 3 hours, and then acetic acid (1.54 ml) and dichloromethane (100 ml) were added thereto, followed by stirring for 30 minutes. Thereafter, stirring was stopped, and an organic layer was separated. The organic layer was washed with a 0.1 N sodium hydroxide aqueous solution (450 ml), and then washed with a 0.1 N hydrochloric acid (450 ml) two times, and further washed with water (450 ml) two times.

The precipitate obtained by pouring the organic layer after washing into methanol (1,000 ml) was taken out by filtration, and dried to obtain an aimed polyarylate resin h having constituents (2), (3), (4), (6) and (8) in the above formula (1) as shown in the following Table 3. The viscosity-average molecular weight of the obtained polyarylate resin h was 66,600.

Preparation Example 33

Preparation of Polyarylate Resin i of Example 20

Sodium hydroxide (14.22 g) and water (1,120 ml) were weighed out in a 1 l beaker, and stirred and dissolved with nitrogen bubbling. Then, benzyltriethylammonium chloride (0.1762 9), 1,1-bis-(4-hydroxyphenyl)cyclohexane [bisphenol Z] (18.14 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (13.54 g) were added thereto, followed by stirring, and then the resulting alkaline aqueous solution was transferred into a 2 reaction bath. Then, p-tert-butylphenol (0.4062 g) was added thereto.

Separately, terephthalic acid chloride (13.88 g) and isophthalic acid chloride (13.88 g) were dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (4.69 ml) was added thereto, followed by stirring for 30 minutes. Thereafter, stirring was stopped, and an organic layer was separated. The organic layer was washed with a 0.1 N sodium hydroxide aqueous solution (560 ml) once, and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin i having constituents (2), (3), (4), (6) and (8) in the above formula (1) as shown in the following Table 3. The viscosity-average molecular weight of the obtained polyarylate resin i was 22,400.

Preparation Example 34

Preparation of Polyarylate Resin j of Example 21

Sodium hydroxide (13.81 g) and water (1,120 ml) were weighed out in a 1 l beaker, and stirred and dissolved with nitrogen bubbling. Then, benzyltriethylammonium chloride (0.1711 g), 1,1-bis-(4-hydroxyphenyl)-1-phenylethane [bisphenol P] (19.06 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (13.15 g) were added thereto, followed by stirring, and then the resulting alkaline aqueous solution was transferred into a 2 l reaction bath. Then, p-tert-butylphenol (0.3944 g) was added thereto.

Separately, terephthalic acid chloride (13.48 g) and isophthalic acid chloride (13.48 g) were dissolved in dichloromethane (560 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (4.55 ml) was added thereto, followed by stirring for 30 minutes. Thereafter, stirring was stopped, and an organic layer was separated. The organic layer was washed with a 0.1 N sodium hydroxide aqueous solution (560 ml), and then washed with a 0.1 N hydrochloric acid (420 ml) two times, and further washed with water (420 ml) two times.

The precipitate obtained by pouring the organic layer after washing into methanol (3,000 ml) was taken out by filtration, and dried to obtain an aimed polyarylate resin j having constituents (2), (3), (4), (6) and (8) in the above formula (1) as shown in the following Table 3. The viscosity-average molecular weight of the obtained polyarylate resin j was 24,500.

Preparation Example 35

Preparation of Polyarylate Resin k of Example 22

Sodium hydroxide (8.29 g) and water (670 ml) were weighed out in a 1 l beaker, and stirred and dissolved with nitrogen bubbling. Then, benzyltriethylammonium chloride (0.1026 g), 1,1-bis-(4-hydroxyphenyl)-1-phenylethane [bisphenol P] (11.44 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (7.89 g) were added thereto, followed by stirring, and then the resulting alkaline aqueous solution was transferred into a 2 l reaction bath. Then, p-tert-butylphenol (0.2366 g) was added thereto.

Separately, terephthalic acid chloride (16.17 g) was dissolved in dichloromethane (340 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.73 ml) was added thereto, followed by stirring for 30 minutes. Thereafter, stirring was stopped, and an organic layer was separated. The organic layer was washed with a 0.1 N sodium hydroxide aqueous solution (340 ml) once, and then washed with a 0.1 N hydrochloric acid (250 ml) two times, and further washed with water (250 ml) two times.

The precipitate obtained by pouring the organic layer after washing into methanol (1,750 ml) was taken out by filtration, and dried to obtain an aimed polyarylate resin k having constituents (2), (3), (4), (6) and (8) in the above formula (1) as shown in the following Table 3. The viscosity-average molecular weight of the obtained polyarylate resin k was 34,800.

Preparation Example 36

Preparation of Polyarylate Resin l of Example 23

Sodium hydroxide (7.41 g) and water (670 ml) were weighed out in a 1 l beaker, and stirred and dissolved with nitrogen bubbling. Then, benzyltriethylammonium chloride (0.0918 g), 2,2-bis-(3-phenyl-4-hydroxyphenyl)propane [bisphenol Q] (13.40 g) and a mixture of bis(4-hydroxyphenyl)methane[p,p'-BPF], (2-hydroxyphenyl)(4-hydroxyphenyl)methane[o,p'-BPF] and bis(2-hydroxymethylphenyl)methane[o,o'-BPF] (BPF-D, manufactured by HONSHU CHEMICAL INDUSTRY CO., LTD., p,p':o,p'-:o,o'=about 35:48:17) (7.05 g) were added thereto, followed by stirring, and then the resulting alkaline aqueous solution was transferred into a 2 l reaction bath. Then, p-tert-butylphenol (0.2116 g) was added thereto.

Separately, terephthalic acid chloride (7.23 g) and isophthalic acid chloride (7.23 g) were dissolved in dichloromethane (340 ml), and the resulting solution was transferred into a dropping funnel.

While keeping the external temperature of the polymerization bath at 20° C., and stirring the alkaline aqueous solution in the reaction bath, the dichloromethane solution was dropwise added thereto from the dropping funnel over 30 minutes. Stirring was further continued for 4 hours, and then acetic acid (2.44 ml) was added thereto, followed by stirring for 30 minutes. Thereafter, stirring was stopped, and an organic layer was separated. The organic layer was washed with a 0.1 N sodium hydroxide aqueous solution (340 ml) once, and then washed with a 0.1 N hydrochloric acid (250 ml) two times, and further washed with water (250 ml) two times.

The precipitate obtained by pouring the organic layer after washing into methanol (1,750 ml) was taken out by filtration, and dried to obtain an aimed polyarylate resin l having constituents (2), (3), (4), (6) and (8) in the above formula (1) as shown in the following Table 3. The viscosity-average molecular weight of the obtained polyarylate resin l was 28,400.

TABLE 3

| | Bisphenol component | | | | Dicarboxylic acid component (8) | | Viscosity average molecular weight Mv |
|---|---|---|---|---|---|---|---|
| | (2) p, p'-BPF | (3) o, p'-BPF | (4) o, o'-BPF | (6) BPA | a TPA | b IPA | |
| Resin a | 0 | 0 | 0 | 100 | 50 | 100 | 40,700 |
| Resin b | 17.5 | 24 | 8.5 | 50 | 50 | 100 | 39,100 |
| | p, p'-BPF | o, p'-BPF | o, o'-BPF | Tm-BPA | | | |
| Resin c | 0 | 0 | 0 | 100 | 100 | 0 | 23,200 |
| Resin d | 17.5 | 24 | 8.5 | 50 | 100 | 0 | 19,600 |
| | p, p'-BPF | o, p'-BPF | o, o'-BPF | BPC | | | |
| Resin e | 0 | 0 | 0 | 100 | 50 | 50 | 40,000 |
| Resin f | 17.5 | 24 | 8.5 | 50 | 50 | 50 | 16,300 |

TABLE 3-continued

|  | Bisphenol component | | | | Dicarboxylic acid component (8) | | Viscosity average molecular weight Mv |
| --- | --- | --- | --- | --- | --- | --- | --- |
|  | (2) p, p'-BPF | (3) o, p'-BPF | (4) o, o'-BPF | (6) BPA | a TPA | b IPA |  |
| Resin g | 17.5 | 24 | 8.5 | 50 | 100 | 0 | 23,500 |
|  | p, p'-BPF | o, p'-BPF | o, o'-BPF | BPZ |  |  |  |
| Resin h | 0 | 0 | 0 | 100 | 50 | 50 | 66,600 |
| Resin i | 17.5 | 24 | 8.5 | 50 | 50 | 50 | 22,400 |
|  | p, p'-BPF | o, p'-BPF | o, o'-BPF | BPP |  |  |  |
| Resin j | 0 | 24 | 0 | 50 | 50 | 50 | 24,500 |
| Resin k | 17.5 | 24 | 8.5 | 50 | 100 | 0 | 34,800 |
|  | p, p'-BPF | o, p'-BPF | o, o'-BPF | BPQ |  |  |  |
| Resin l | 17.5 | 24 | 8.5 | 50 | 50 | 50 | 28,400 |

Preparation of Photoreceptor

Example 1

10 Parts by weight of β-form oxytitanium phthalocyanine having the following structure was added to 150 parts by weight of 4-methoxy-4-methylpentanone, and grinding dispersion treatment was carried out by means of a sand grinding mill.

Further, 100 parts by weight of a 5% 1,2-dimethoxyethane solution of polyvinyl butyral (manufactured by Denki Kagaku Kogyo K.K., tradename "Denka Butyral", #6000C) and 100 parts by weight of a 5% 1,2-dimethoxyethane solution of a phenoxy resin (manufactured by Union Carbide, tradename PKHH) were mixed to prepare a binder solution.

To 160 parts by weight of the above prepared pigment dispersion, 100 parts by weight of the binder solution and an appropriate amount of 1,2-dimethoxyethane were added to prepare a dispersion having a final solid content concentration of 4.0%.

The dispersion thus obtained was coated on a polyethylene terephthalate film having aluminum vapor deposited on its surface so that the film thickness would be 0.4 μm to provide a charge generation layer. Then, on the film, a liquid obtained by dissolving 50 parts by weight of a hole transport compound [1] as shown below, 100 parts by weight of the polyarylate resin F prepared in Preparation Example 6, 8 parts by weight of an antioxidant (IRGANOX 1076) and 0.03 part by weight of silicone oil as a leveling agent in 640 parts by weight of a mixed solvent of tetrahydrofuran and toluene (tetrahydrofuran: 80 wt %, toluene: 20 wt %) was coated, followed by drying at 125° C. for 20 minutes to provide a charge transport layer so that the film thickness after drying would be 20 μm. Here, the solubility of the polyarylate resin F in the mixed solvent of tetrahydrofuran and toluene was good. Further, even after this coating solution was left to stand at room temperature for one week, no change such as solidification was observed. The results of the solubility and solution stability are shown in Table 4.

Examples 2 to 22 and Comparative Examples 1 to 14

The same operation as in Example 1 was carried out except that each of the polyarylate resins prepared in Preparation Examples was used instead of the polyarylate resin used in Example 1. The results of the solubility and solution stability are shown in Table 4. With respect to the obtained photoreceptor, the following evaluations were carried out.

[Friction Test]

Toner was uniformly provided on the photoreceptor manufactured as described above so as to achieve 0.1 mg/cm$^2$, and an urethane rubber cut into a 1-cm-wide piece, made of the same material as that for a cleaning blade was used at 45 degrees as the surface to be contacted. The coefficient of kinetic friction for the one hundredth cycle when the urethane rubber had been traveled with a load of 200 g, a velocity of 5 mm/sec, and a stroke of 20 mm 100 times was determined by means of a Fully Automatic Friction Abrasion Testing Machine DFPM-SS manufactured by Kyowa Interface Science Co., Ltd. The results are shown in Table 4.

[Abrasion Test]

A photoreceptor film was cut in circle with a diameter of 10 cm to carry out the abrasion evaluation by means of a Taber abrader (manufactured by Toyo Seiki Seisakusyo K.K.). Under the test conditions of 23° C., and 50% RH atmosphere, using a truck wheel CS-10F, and no load (the truck wheel's own weight), the abrasion amount is after 1,000 revolutions was determined by comparing the weights before and after the test. The results are shown in Table 4.

[Electric Characteristics]

By using an electrophotographic characteristic evaluation apparatus (described on pages 404 to 405 in "Electrophotography—Bases and applications, second series" edited by the Society of Electrophotography, Published by Corona Co.), manufactured in accordance with the measurement standard by the Society of Electrophotography, a test was carried out in the following manner. The photoreceptor was stuck on a drum made of aluminum to be formed in cylinder, and the continuity between the drum made of aluminum and the aluminum substrate of the photoreceptor was ensured. Then, the drum was rotated at a constant rpm to preform the electric characteristic evaluation test by cycles of charging, exposure, potential measurement, and charge removal. In this step, the initial surface potential was set at −700 V, exposure was carried out by using a 780-nm monochromatic light, the charge removal was carried out by using a 660-nm monochromatic light, and the surface potential (VL) at the time of irradiation with 2.4 μJ/cm$^2$ of the 780-nm light. For the VL measurement, the time required for exposure-potential measurement was set at 139 ms. The measurements were carried out under the environment of the temperature of 25° C. and a relative humidity of 50% (VL:NN), and a temperature of 5° C. and a relative humidity of 10% (VL:LL). The smaller the absolute value of the surface potential (VL), the better the response characteristics. The results are shown in Table 4.

TABLE 4

| | | Solubility | | Abrasion test | Friction test | Electric characteristics | |
|---|---|---|---|---|---|---|---|
| | | THF/Toluene | Storage stability | Abrasion amount (mg) | Coefficient of friction | VL:NN | VL:LL |
| Comp. Ex. 1 | Resin A | Insoluble | X | X | X | X | X |
| Comp. Ex. 2 | Resin B | Insoluble | X | X | X | X | X |
| Comp. Ex. 3 | Resin C | Insoluble | X | X | X | X | X |
| Comp. Ex. 4 | Resin D | Soluble | Good | X | X | X | X |
| Comp. Ex. 5 | Resin E | Insoluble | X | X | X | X | X |
| Ex. 1 | Resin F | Soluble | Good | — | — | 17 | — |
| Ex. 2 | Resin G | Soluble | Good | — | — | 20 | — |
| Ex. 3 | Resin H | Soluble | Good | — | — | 29 | — |
| Ex. 4 | Resin I | Soluble | Unstable | — | — | 53 | — |
| Ex. 5 | Resin J | Soluble | Good | — | — | 42 | — |
| Comp. Ex. 6 | Resin K | Soluble | Unstable | 5 | 0.437 | 42 | 81 |
| Comp. Ex. 7 | Resin L | Insoluble | X | X | X | X | X |
| Comp. Ex. 8 | Resin M | Insoluble | X | X | X | X | X |
| Comp. Ex. 9 | Resin N | Insoluble | X | X | X | X | X |
| Ex. 6 | Resin O | Soluble | Good | 4.6 | 0.400 | 41 | 75 |
| Ex. 7 | Resin P | Soluble | Good | 3.6 | 0.465 | 35 | 69 |
| Ex. 8 | Resin Q | Soluble | Good | 3.7 | 0.485 | 16 | 37 |
| Ex. 9 | Resin R | Soluble | Good | 4.3 | 0.478 | 23 | 55 |
| Ex. 10 | Resin S | Soluble | Good | 4.4 | 0.475 | 30 | 68 |
| Ex. 11 | Resin T | Soluble | Good | 2.6 | 0.485 | 19 | 56 |
| Ex. 12 | Resin U | Soluble | Good | 3.4 | 0.488 | 24 | 58 |
| Ex. 13 | Resin V | Soluble | Good | 4.9 | 0.490 | 26 | 52 |
| Ex. 14 | Resin W | Soluble | Good | 6.0 | 0.470 | 39 | 72 |
| Ex. 15 | Resin X | Soluble | Good | 4.0 | 0.469 | 40 | 68 |
| Comp. Ex. 10 | Resin a | Soluble | Good | 5.3 | 0.577 | — | 160 |
| Ex. 16 | Resin b | Soluble | Good | 3.1 | 0.534 | 35 | 93 |
| Comp. Ex. 11 | Resin c | Soluble | Unstable | 7.2 | 0.558 | 44 | 73 |
| Ex. 17 | Resin d | Soluble | Good | 7.0 | 0.522 | 33 | 65 |
| Comp. Ex. 12 | Resin e | Soluble | Good | 5.3 | 0.570 | 161 | 271 |
| Ex. 18 | Resin f | Soluble | Good | 5.1 | 0.500 | 25 | 62 |
| Ex. 19 | Resin g | Soluble | Good | 4.1 | 0.510 | 17 | 52 |
| Comp. Ex. 13 | Resin h | Insoluble | X | X | X | X | X |
| Ex. 20 | Resin i | Soluble | Good | — | — | 60 | 117 |
| Comp. Ex. 14 | Resin j | Soluble | Good | 4.0 | 0.575 | 51 | 99 |
| Ex. 21 | Resin k | Soluble | Good | 3.2 | 0.526 | 43 | 75 |
| Ex. 22 | Resin l | Soluble | Good | 7.0 | 0.556 | 30 | 73 |

X: measurement infeasible
—: No data

From the above result, it is found that the polyarylate resin of a specific structure is excellent in electric characteristics particularly response characteristics, and exhibits a high solubility in a non-halogen type solvent and a high solution stability. By using such a polyarylate resin, an electrophotographic photoreceptor excellent in response characteristics, and having good mechanical properties, abrasion resistance and sliding properties can be obtained stably.

The electrophotographic photoreceptor of the present invention using a polyarylate resin of a specific structure is excellent in electric characteristics particularly response characteristics, and exhibits a high solubility even in a non-halogen type solvent, and has adequate mechanical properties.

While the invention has been described in detail and with reference to specific embodiments thereof, it will be apparent to one skilled in the art that various changes and modifications can be made therein without departing from the spirit and scope thereof.

What is claimed is:
1. An electrophotographic photoreceptor, comprising a photosensitive layer formed on an electroconductive substrate, wherein the photosensitive layer comprises a resin having repeating units of the following formula (1):

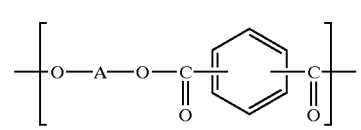

(1)

where, in the formula (1), A represents a plurality of bivalent groups including at least two members selected from the group consisting of bivalent groups of the following formulae (2), (3) and (4)

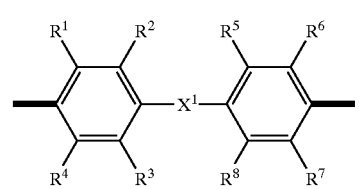

(2)

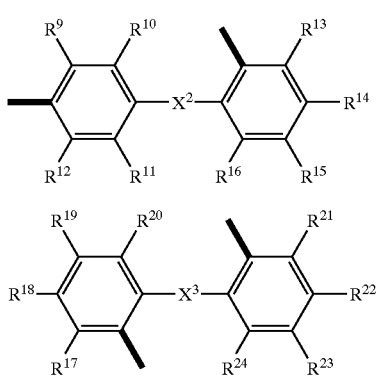

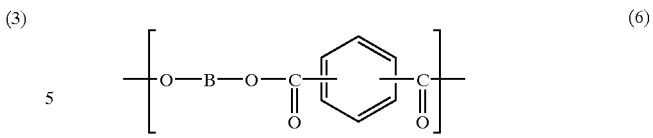

where, in the formula (6), B represents a bifunctional phenol component, a biphenol component, a bisphenol component or a bivalent group of the following formula (7):

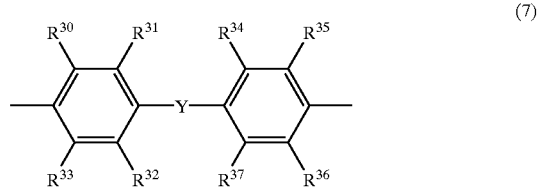

where, in the formulae (2), (3) and (4), each of $R^1$ to $R^{24}$ which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group, or a substituted or unsubstituted $C_{6-20}$ aromatic group, and each of $X^1$, $X^2$ and $X^3$ which may be the same or different, represents a single bond, a bivalent organic group of the formula (5), —O—, —S—, —CO—, —SO$_2$— or —(CH$_2$)$_S$—, wherein S is an integer of from 2 to 5 where, in formula (7), each of $R^{30}$ to $R^{37}$ which are independent of one another, represents a hydrogen atom, a $C_{1-10}$ alkyl group, a $C_{1-10}$ alkoxyl group, a halogen atom, a halogenated alkyl group or a substituted or unsubstituted $C_{6-20}$ aromatic group, Y represents a single bond or —CR$^{38}$R$^{39}$—, and each of $R^{38}$ and $R^{39}$ represents a hydrogen atom, a $C_{1-10}$ alkyl group, a $C_{6-20}$ alkoxyl group, a halogen atom, a halogenated alkyl group or a substituted or unsubstituted $C_{6-20}$ aromatic group, provided that $R^{38}$ and $R^{39}$ may be bonded to each other to form a cyclic structure, provided that the group of the formula (7) is not the same as the group of the formula (2).

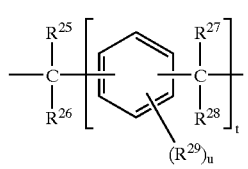

7. The electrophotographic photoreceptor according to claim 6, wherein the content of the repeating units of the formula (1) in said resin is ranges from 10 to 90 mol %, based on the total moles of repeating units of formulae (1) and (6) units in said resin.

8. The electrophotographic photoreceptor according to claim 6, wherein the content of the repeating units of the formula (1) in said resin ranges from 30 to 80 mol %, based on the total moles of repeating units of formulae (1) to and (6) units in said resin.

9. The electrophotographic photoreceptor according to claim 6, wherein the portion having a structure of the following formula (8) in the formulae (1) and (6) is at least one member selected from the group consisting of structures of the following formula (9):

where, in the formula (5), each of $R^{25}$ to $R^{29}$ which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group or a substituted or unsubstituted $C_{6-20}$ aromatic group, provided that $R^{25}$ and $R^{26}$, and $R^{27}$ and $R^{28}$, may be bonded to each other to form a cyclic structure, t is an integer of from 0 to 5, and u is an integer of from 0 to 4.

2. The electrophotographic photoreceptor according to claim 1, wherein the proportion of the bivalent arouns of formulae (3) and (4) of bivalent unit A in the formula (1) ranges from 30 to 100 mol %, based on bivalent unit A of formula (1) as 100 mol %, in said resin.

3. The electrophotographic photoreceptor according to claim 1, wherein each of $R^1$ to $R^{24}$ in the formulae (2), (3) and (4) are substituted or unsubstituted $C_{1-10}$ alkyl groups.

4. The electrophotographic photoreceptor according to claim 1, wherein $X_1$ to $X_3$ in the formulae (2), (3) and (4) are bivalent organic groups of the formula (5) or —(CH$_2$)$_S$—, wherein S is an integer of from 2 to 5.

5. The electrophotographic photoreceptor according to claim 1, wherein $R^1$ to $R^{24}$ in the formulae (2), (3) and (4) are substituted or unsubstituted $C_{1-10}$ alkyl groups, and $X^1$ to $X^3$ are bivalent organic groups of the formula (5).

6. The electrophotographic photoreceptor according to claim 1, wherein the resin is a copolymer comprising repeating units of the formula (1) and the following formula (6):

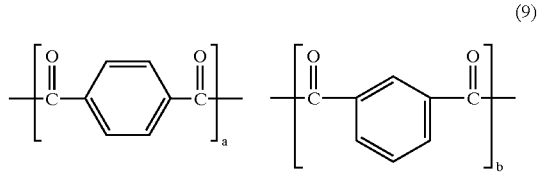

where, in the formula (9), a and b satisfy $0 \leq a \leq 1$ and $0 \leq b \leq 1$ and a+b=1.

10. The electrophotographic photoreceptor according to claim 9, wherein in the formula (9), a and b satisfy $0.5 \leq a/(a+b) \leq 1$.

11. The electrophotographic photoreceptor according to claim 9, wherein in the formula (9), a and b satisfy a/(a+b)=1.

12. The electrophotographic photoreceptor according to claim 6, wherein any four among $R^{30}$ to $R^{37}$ in the bivalent group of formula (7) are hydrogen.

13. The electrophotographic photoreceptor according to claim 6, wherein any four among $R^{30}$ to $R^{37}$ in the bivalent group of the formula (7) are methyl groups.

14. The electrophotographic photoreceptor according to claim 6, wherein both $R^{38}$ and $R^{39}$ in Y in the bivalent group of formula (7) are hydrogen atoms.

15. The electrophotographic photoreceptor according to claim 6, wherein, in said resin, the proportion of the bivalent group of formula (2) is at most 45 mol % based on the number of mol % of bivalent groups of A in formula (1) and B in formula (6).

16. The electrophotographic photoreceptor according to claim 1, wherein all of $X^1$, $X^2$ and $X^3$ in the bivalent groups of formulae (2), (3) and (4) are —$CH_2$—.

17. The electrophotographic photoreceptor according to claim 1, wherein said resin comprising the structure of formula (1) has a viscosity-average molecular weight ranging from 15,000 to 100,000.

18. The electrophotographic photoreceptor according to claim 1, wherein said resin comprising the structure of formula (1) is completely soluble in a solvent obtained by mixing 80 wt % of tetrahydrofuran and 20 wt % of toluene in an amount of 7 times the weight of the resin.

19. The electrophotographic photoreceptor according to claim 1, wherein said resin is present in the outermost layer.

20. The electrophotographic photoreceptor according to claim 19, wherein the content of said resin in the outermost layer is from 40 wt % to 90 wt %, based on the total weight of said outermost layer.

21. The electrophotographic photoreceptor according to claim 1, wherein the photosensitive layer comprises a charge generation material and a charge transport material.

22. The electrophotographic photoreceptor according to claim 21, wherein said charge transport material is at least one member selected from the group consisting of a carbazole derivative, a hydrazone derivative, an aromatic amine derivative, a stilbene derivative, a butadiene derivative and a compound having a structure comprising a plurality of these derivatives bonded together.

23. A The electrophotographic photoreceptor according to claim 21, wherein said charge transport material comprises a plurality of an aromatic amine derivative, a stilbene derivative and a butadiene derivative bonded together.

24. The electrophotographic photoreceptor according to claim 21, wherein said charge transport material is one having a structure of the following formula (10):

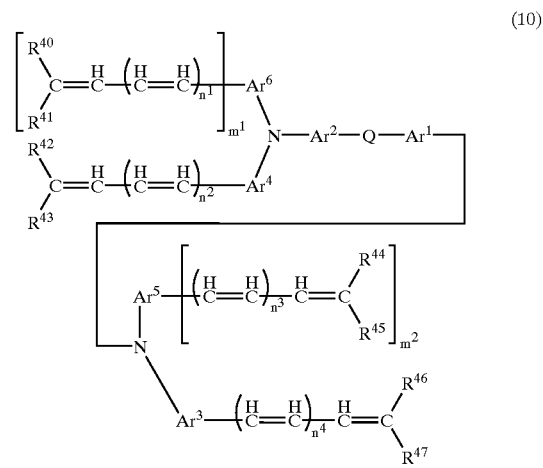

wherein, in the formula (10), each of $Ar^1$ to $Ar^4$ which are independent of one another, represents a substituted or unsubstituted arylene group or a substituted or unsubstituted bivalent heterocycle group, each of $Ar^5$ and $Ar^6$ represents, when $m^1=0$ and $m^2=0$, a substituted or unsubstituted ailcyl group, a substituted or unsubstituted aryl group or a substituted or unsubstituted monovalent heterocycle group, and when $m^1=4$ and $m^2=1$, a substituted or unsubstituted alkylene group, a substituted or unsubstituted arylene group or a substituted or unsubstituted bivalent heterocycle group, Q represents a direct bond or a bivalent residue, each of $R^{40}$ to $R^{47}$ which are independent of one another, represents a hydrogen-atom, a substituted or unsubstituted alkyl group, a substituted or unsubstituted aryl group, a substituted or unsubstituted aralkyl group, or a substituted or unsubstituted heterocycle group, each of $n^1$ to $n^4$ which are independent of one another, represents an integer ranging from 0 to 4, and each of $m^1$ and $m^2$ which are independent of each other, represents 0 or 1, provided that $Ar^1$ to $Ar^6$ may be bonded to each other to form a cyclic structure.

25. The electrophotographic photoreceptor according to claim 24, wherein in the formula (10), each of $Ar^1$ and $Ar^2$ is a phenylene group, and each of $A^5$ and $Ar^6$ is a phenyl group.

26. The electrophotographic photoreceptor according to claim 24, wherein in the formula (10), $R^{40}$ to are substituted or unsubstituted $C_{6-20}$ alkyl groups.

27. The electrophotographic photoreceptor according to claim 1, wherein the photosensitive layer comprises a charge generation layer and a charge transport layer laminated.

28. A method of producing a electrophotographic photoreceptor, comprising forming a photosensitive layer on an electroconductive substrate, wherein said photosensitive layer comprises a resin having repeating units of the following formula (1):

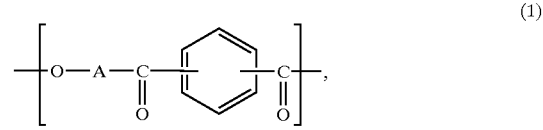

where, in the formula (1), A represents a plurality of bivalent groups including at least two members selected from the group consisting of bivalent groups of the following formulae (2), (3) and (4)

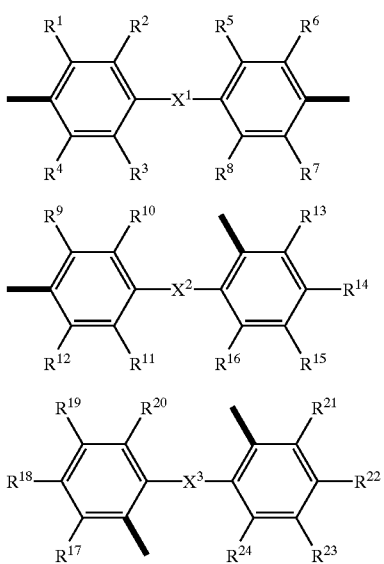

(2)

(3)

(4)

where, in the formulae (2), (3) and (4), each of $R^1$ to $R^{24}$ which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group, or a substituted or unsubstituted $C_{6-20}$ aromatic group, and each of $X^1$, $X^2$ and $X^3$ which may be the same or different, represents a single bond, a bivalent organic group of formula (5), —O—, —S—, —CO—, —SO$_2$— or —(CH$_2$)$_S$—, wherein S is an integer of from 2 to 5

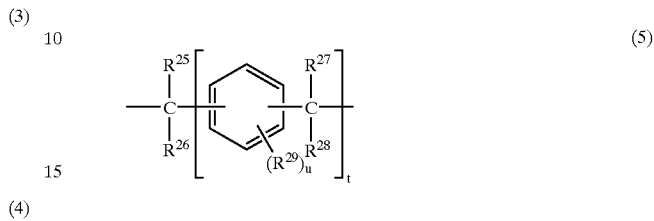

(5)

where, in the formula (5), each of $R^{25}$ to $R^{29}$ which are independent of one another, represents a hydrogen atom, a substituted or unsubstituted $C_{1-10}$ alkyl group, a substituted or unsubstituted $C_{1-10}$ alkoxyl group, a halogen atom, a halogenated alkyl group or a substituted or unsubstituted $C_{6-20}$ aromatic group, provided that $R^{25}$ and $R^{26}$, and $R^{27}$ and $R^{28}$, may be bonded to each other to form a cyclic structure, t is an integer of from 0 to 5.

* * * * *